US010291755B2

(12) United States Patent
Knaappila

(10) Patent No.: US 10,291,755 B2
(45) Date of Patent: May 14, 2019

(54) SYSTEMS AND METHODS FOR ADAPTIVE SCANNING AND/OR ADVERTISING

(71) Applicant: Silicon Laboratories Inc., Austin, TX (US)

(72) Inventor: Jere M. Knaappila, Evitskog (FI)

(73) Assignee: Silicon Laboratories Inc., Austin, TX (US)

( * ) Notice: Subject to any disclaimer, the term of this patent is extended or adjusted under 35 U.S.C. 154(b) by 17 days.

(21) Appl. No.: 15/650,405

(22) Filed: Jul. 14, 2017

(65) Prior Publication Data
US 2019/0020741 A1 Jan. 17, 2019

(51) Int. Cl.
| | |
|---|---|
| *H04B 7/00* | (2006.01) |
| *H04L 29/08* | (2006.01) |
| *H04W 52/02* | (2009.01) |
| *H04W 8/00* | (2009.01) |
| *H04W 80/02* | (2009.01) |
| *H04W 4/80* | (2018.01) |
| *H04W 84/18* | (2009.01) |
| *H04W 76/14* | (2018.01) |
| *H04W 76/10* | (2018.01) |

(52) U.S. Cl.
CPC ............ *H04L 69/321* (2013.01); *H04W 4/80* (2018.02); *H04W 8/005* (2013.01); *H04W 52/0209* (2013.01); *H04W 80/02* (2013.01); *H04W 76/10* (2018.02); *H04W 76/14* (2018.02); *H04W 84/18* (2013.01)

(58) Field of Classification Search
CPC ..... H04W 69/321; H04W 4/80; H04W 8/005; H04W 80/02; H04W 52/0209; H04W 76/14; H04W 76/10; H04W 84/18
USPC ........................................................ 455/41.2
See application file for complete search history.

(56) References Cited

U.S. PATENT DOCUMENTS

| | | | |
|---|---|---|---|
| 9,265,080 B1* | 2/2016 | Palin ...................... | H04W 8/005 |
| 9,860,297 B2* | 1/2018 | Palin ...................... | H04W 4/029 |
| 9,894,691 B1* | 2/2018 | Hellman ............... | H04W 76/10 |

(Continued)

OTHER PUBLICATIONS

ETSI EN 300 328 V2.1.1, "Wideband Transmission Systems; Data Transmission Equipment Operating In The 2,4 GHz ISM Band And Using Wide Band Modulation Techniques; Harmonised Standard Covering The Essential Requirements Of Article 3.2 of Directive 2014,/53/EU", Nov. 2016, 101 pgs.
Argennox, "A BLE Advertising Primer", Printed From Internet May 24, 2017, 14 pgs.
Brauer et al., T Berlin, "On Practical Selective Jamming Of Bluetooth Low Energy Advertising", Printed From Internet Jun. 17, 2017, 23 pgs.

(Continued)

*Primary Examiner* — April G Gonzales
(74) *Attorney, Agent, or Firm* — Egan Peterman Enders Huston

(57) ABSTRACT

Systems and methods are provided that may be implemented to adaptively control advertising and/or scanning operations on multiple advertising channels in a wireless network environment. In one example, a wireless device may monitor for wireless activity from other protocols (e.g., such as Wi-Fi or Zigbee) on the frequency of one or more of the multiple advertising channels of a first wireless network protocol, such as a BLE wireless network protocol. The wireless device may respond in real time to the detected presence of wireless activity from other protocols on one or more of the advertising channels of the first protocol by dynamically varying the identity of which advertising channels are employed at any given time for advertising and/or scanning.

24 Claims, 15 Drawing Sheets

(56) References Cited

U.S. PATENT DOCUMENTS

| | | | | |
|---|---|---|---|---|
| 2014/0321321 | A1* | 10/2014 | Knaappila | H04W 52/0209 370/254 |
| 2015/0173110 | A1* | 6/2015 | Takahashi | H04W 72/0453 455/41.2 |
| 2015/0195673 | A1* | 7/2015 | Rantapuska | H04W 4/06 455/3.05 |
| 2015/0271628 | A1* | 9/2015 | Knaappila | H04W 4/80 455/41.2 |
| 2015/0289081 | A1* | 10/2015 | Chen | H04W 8/005 455/41.2 |
| 2015/0289124 | A1* | 10/2015 | Palin | H04W 8/005 455/41.2 |
| 2015/0319600 | A1* | 11/2015 | Knaappila | H04W 8/005 455/41.2 |
| 2015/0341450 | A1* | 11/2015 | Reunamaki | H04L 67/18 705/14.58 |
| 2015/0373749 | A1* | 12/2015 | Palin | H04W 76/10 455/41.2 |
| 2016/0157078 | A1* | 6/2016 | Palin | H04W 8/005 455/41.2 |
| 2017/0026905 | A1* | 1/2017 | Denboer | H04W 4/70 |
| 2017/0230810 | A1* | 8/2017 | Banerjea | H04W 8/005 |

OTHER PUBLICATIONS

Galeev, "Bluetooth 4.0: An Introduction To Bluetooth Low Energy", Part 1, Jul. 2011, 7 pgs.

CSR, "Bluetooth Low Energy", Available prior to the filing dated of the current patent application, 48 pgs.

Hegenderfer, "Get Ready for Bluetooth Mesh!", Bluetooth Blog, Nov. 2016, 3 pgs.

ThoughtWorks, "Introduction To Bluetooth Meshes", Nov. 2016, 7 pgs.

Cho, "Analysis Of Latency Performance Of Bluetooth Low Energy (BLE) Networks", Sensors ISSN 1424-8220, 2014, 20 pgs.

Texas Instruments, Application Report, Bluetooth Low Energy Beacons, SWRA475A, Jan. 2015, 16 pgs.

Strand, "Bluetooth Low Energy Central Tutorial", Nordic Developer Zone, Nov. 2015, 9 pgs.

Knaappila, "Multiple Link Layers And Advertisement Policies For Wireless Communication", U.S. Appl. No. 15/234,332, filed Aug. 11, 2016, 28 pgs.

Knaappila, "Packet Transmission Timing Parameter Discovery For Wireless Communication Sychronization" U.S. Appl. No. 15/197,166, filed Jun. 29, 2016, 35 pgs.

* cited by examiner

SYSTEMS AND METHODS FOR ADAPTIVE SCANNING AND/OR ADVERTISING

FIELD

The disclosed systems and methods relate to wireless communication and, more particularly, to advertising and scanning in wireless communication environments.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited only those, but increasingly more new application utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudorandom intervals, pass advertising packets which the master device (also known as scanner device, i.e., "scanner") is scanning. Depending on the type of advertising packet sent by a slave device, the master device may respond to the received advertising packet by requesting a connection with the slave device, or may respond by requesting further information from the advertising device.

The BLE specification (Bluetooth Specification Versions 4.0, 4.1, 4.2) requires that individual BLE advertising packets be transmitted periodically from a BLE advertising device in advertising mode at T_advEvent intervals. T_advEvent consists of two components, advInterval which is a fixed time value, and advDelay which is a pseudorandom delay time for adding pseudorandom jitter of from 0 to 10 milliseconds. BLE advertising devices operating in advertisement mode in a Bluetooth mesh network environment use three different advertising channels (BLE channels 37, 38 and 39) to transmit advertisement (or advertising) data. Bluetooth mesh networks currently use advertising channels to transfer data, and interference from other network protocols, such as Wi-Fi or Zigbee protocols, may cause transmission errors in these channels. For compatibility reasons with Bluetooth enabled phones, Bluetooth mesh devices also support transferring data over Bluetooth connection.

A BLE advertising device typically transmits the same advertisement data on each advertising channel (BLE channels 37, 38 and 39) in a fixed sequence in an attempt to compensate for possible interference with one or more of the advertising channels from other wireless network protocols such as Wi-Fi and Zigbee. A BLE scanning device in the same network environment switches between the scanned advertising channels in a fixed sequence in order to scan packets on all advertising channels. In such a network environment, BLE devices scanning for transmitted advertisement packets do not know in advance on what channel and at what time an advertising device will transmit its next advertising packet.

SUMMARY

Disclosed herein are systems and methods that may be implemented to adaptively control advertising and/or scanning operations on multiple advertising channels in a wireless network environment, e.g., such as BLE mesh network environment or any other type BLE or other wireless protocol network that utilizes multiple advertising channels. The disclosed systems and methods may be advantageously implemented in one embodiment by a wireless device to monitor for wireless activity from other co-existing protocols (e.g., such as Wi-Fi or Zigbee) on the frequency of one or more of the multiple advertising channels of a first wireless network protocol, such as the BLE wireless network protocol. The wireless device of the first protocol may respond in real time to the detected presence of wireless activity from such other protocols on one or more of the advertising channels of the first protocol by dynamically varying the identity of which advertising channels are employed at any given time for advertising and/or scanning. In this way the disclosed systems and methods may be implemented in one embodiment to compensate for interference encountered on advertising channels during advertising device and/or scanning device operations in a manner that overcomes poor performance of fixed-sequence and non-adaptive conventional advertising channel selection algorithms that may occur in crowded network environments, such as mesh network environments.

In one exemplary embodiment, an advertising device may listen before the next scheduled transmission time for an advertising packet on a given advertising channel to detect if there is any other radio frequency (RF) signal activity on the given channel before the next scheduled time for transmitting the advertising packet. In one embodiment, the advertising device may listen for other RF signal activity on a given channel immediately before transmitting an advertising packet on the same channel, i.e., during the same advertising event that transmits on each of the multiple different advertising channels according to a defined channel priority order. In another embodiment, the advertising device may listen for other RF signal activity on a given channel immediately after transmitting an advertising packet on the same channel. In any case, when other signal activity is detected on any given channel, the advertising device may skip the next scheduled transmission of the advertising packet on the given channel, whether it is scheduled to occur during the current advertising event or during a future (e.g., next) advertising event. Instead, the advertising device may attempt transmission of the advertising packet on each of the other advertising channels that are scheduled for transmission after the skipped advertising channel before again attempting to transmit an advertising packet on the given advertising channel according to the defined channel priority order. In a further embodiment, the advertising device may only skip transmission of an advertising packet on a given advertising channel when it detects the presence of other RF signal activity on the given channel has existed for a duration of time that meets or exceeds a defined signal activity minimum time threshold. In this further embodiment, the advertising device may transmit the advertising packet on a given channel even if it detects the presence of other signal activity on the given channel if the other signal activity has not existed for a duration of time that meets the signal activity minimum time threshold.

In another exemplary embodiment, a scanning device may listen on a given advertising channel to detect any RF signal activity on the given advertising channel during a current scanning sequence of multiple advertising channels. The scanning device may continue normal scanning on the given advertising channel as long as no signal activity is detected on the given channel that does not have the correct access address (AA) corresponding to an advertising packet of the current wireless protocol used by the scanning device. However, if the scanning device detects signal activity on the given channel that does not have the correct AA, it indicates that the given channel is being used by another protocol In this case, the scanning device may switch to scan another advertising channel of the current scanning sequence. In a further exemplary embodiment, the scanning device may only switch to scan another advertising channel when it detects signal activity on the given channel but has not received any packets that have the correct AA corresponding to an advertising packet within a defined maximum signal activity time threshold, e.g., such as a time derived from a maximum packet length. In an alternative embodiment, the scanning device may lower channel priority rather than switching to scan another advertising channel of the scanning sequence. In such an embodiment, the scanning device may implement a channel switching algorithm to take this priority information into account when selecting a next channel of the current scanning sequence to switch to. This allows dynamic adjustment of advertising channel scanning time based on changing conditions.

In one respect, disclosed herein is a method of operating a wireless device as an advertising device, including: monitoring multiple RF advertising channels to detect the presence of radio frequency (RF) signal activity on each of the multiple different RF advertising channels; and determining whether or not to transmit an advertising packet from the wireless device on each of the given RF advertising channels based on presence of detected RF signal activity on the given RF advertising channel.

In another respect, disclosed herein is a method of operating a wireless device as a scanning device, including: using a scanning sequence of multiple listening windows to listen for advertising packets on multiple different radio frequency (RF) advertising channels according to a defined channel priority order that includes a respective listening window time assigned to each of the multiple RF advertising channels; monitoring for the presence of extraneous RF signal activity on each of the multiple different RF advertising channels during its respective listening window time; determining whether or not to modify the defined channel priority order of a current or future scanning sequence based on the detection of extraneous RF signal activity on at least one of the RF advertising channels during its listening window time; and modifying the defined channel priority order of the current or future scanning sequence if so determined.

In another respect, disclosed herein is an apparatus, including at least one processing device coupled to radio circuitry and configured to be coupled to an antenna as a wireless advertising device. The at least one processing device may be programmed to control the advertising device to: monitor multiple RF advertising channels to detect the presence of radio frequency (RF) signal activity on each of the multiple different RF advertising channels; and determine whether or not to transmit an advertising packet from the wireless device on each of the given RF advertising channels based on presence of detected RF signal activity on the given RF advertising channel.

In another respect, disclosed herein is an apparatus, including at least one processing device coupled to radio circuitry and configured to be coupled to an antenna as a wireless scanning device. The at least one processing device may be programmed to control the scanning device to: use a scanning sequence of multiple listening windows to listen for advertising packets on multiple different radio frequency (RF) advertising channels according to a defined channel priority order that includes a respective listening window time assigned to each of the multiple RF advertising channels; monitor for the presence of extraneous RF signal activity on each of the multiple different RF advertising channels during its respective listening window time; determine whether or not to modify the defined channel priority order of a current or future scanning sequence based on the detection of extraneous RF signal activity on at least one of the RF advertising channels during its listening window time; and modify the defined channel priority order of the current or future scanning sequence if so determined.

DESCRIPTION OF ILLUSTRATIVE EMBODIMENTS

Figure 1:
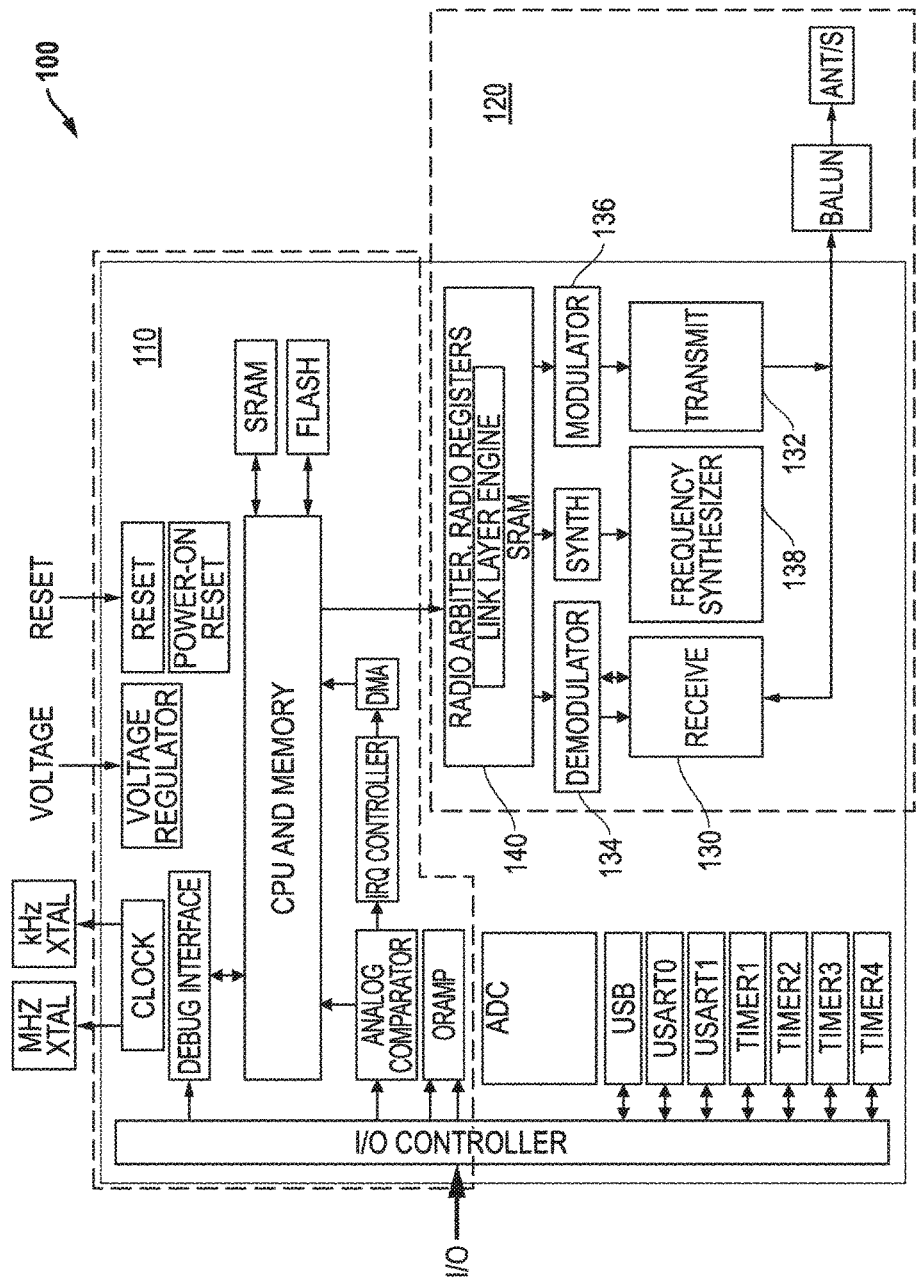
FIG. 1 illustrates a simplified block diagram of a Bluetooth radio module according to one exemplary embodiment of the disclosed systems and methods.

FIG. 1 illustrates a simplified block diagram of an example radio apparatus configured in the form of a BLE radio module 100 that may be employed in one exemplary embodiment as a BLE device to implement the disclosed systems and methods. Although examples are described herein relating to BLE devices in communication using BLE protocol, it will be understood that similar methodology for adaptively controlling advertising and/or scanning operations may be employed for any other type of RF communication technology and/or radio module hardware and software/firmware configuration that employs advertising packets transmitted on multiple advertising channels (frequencies).

As shown in FIG. 1, BLE module 100 includes a first module segment 110 that includes one or more central processing units (CPUs), processors or other processing devices and memory with application data. A second module segment 120 is configured to implement a part of a link layer and physical layer for radio module 100, and includes components such as radio arbiter and registers 140, link layer engine 125, modulator 136 and demodulator 134, receiver 130 and transmitter 132, frequency synthesizer 138, balancing-unbalancing unit ("balun"), antenna ("ant"). Second module 120 also may include mixer/s, amplifier/s, filter/s and other radio circuitry suitable for respective radio transmission and reception operations. In one embodiment, second module segment 120 may include memory and one or more microcontrollers, processors or other processing devices programmed or otherwise configured to execute one or more components of module segment 120, e.g., such as link layer engine 125. In one embodiment the one or more processing devices, memory, and clock circuitry of module segment 110 may be coupled to each other and to components of module segment 120 through a system bus interconnect or one or more other types of suitable communication media, including one or more electrical buses and/or intervening circuitry that provides electrical communications. In certain embodiments, memory of module segments 110 and 120 may contain instructions which, when executed by processing devices of BLE module 100, enable the BLE module 100 to operate as a BLE device to perform the functions described herein. Memory of BLE module 100 may be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 120 includes circuitry that operates as a wireless interface for first module segment 110 and that is coupled to an antenna as shown. Second module segment 120 may include a radio that includes baseband processing, MAC (media access control) level processing, and/or other physical layer processing for BLE packet communications. The processing devices of first module segment 110 and second module segment 120 may also read and write from the various system memory during operations, for example, to store packet information being received from or transmitted to another BLE device. Although not shown, BLE module 120 may also be coupled receive power from a power supply, which may be a battery or a connection to a permanent power source such as a wall outlet.

CPU/s of first module segment 110 may be employed to implement a host layer and an application layer that includes apparatus-related application/s (e.g., heart rate, proximity, blood pressure, time update, temperature, battery, etc.), smart profiles, and script and application programming interface (API). Such an application layer may be capable of reading sensor data (e.g., from heart rate sensor, etc.), and reporting the data to the host layer for transmission using Bluetooth (or BLE) controller of second module segment 120. Link layer engine 125 may be employed to implement a link layer that is present to provide ultra-low power idle mode operation and device discovery (i.e., connection mode and advertising mode handling). Link layer is also configured to control scanning, packet transmission and response. Further information on BLE radio modules and components and layers thereof may be found, for example, in United States Patent Application Publication No. 2014/0321321; United States Patent Application Publication No. 2015/0319600; and United States Patent Application Publication No. 20150271628, each of which is incorporated herein by reference in its entirety for all purposes.

In BLE technology, one or more so called slave devices may be connected to a master device. The master may be configured to communicate with one or more slave devices—also simultaneously. To let the master device know about the slave devices prior to establishing a master-slave connection, the slave devices (or at that point "advertisers") may periodically, at pseudo-random intervals, pass advertising packets which a master device (at that point a scanner device, i.e. "scanner") is scanning.

Example advertising packet types that may be transmitted from a slave device include:
  ADV_IND connectable and scannable undirected advertising event
  ADV_DIRECT_IND connectable directed advertising event
  ADV_NONCONN_IND non-connectable or non-scannable undirected advertising event
  ADV_SCAN_IND scannable undirected (non-connectable) advertising event.

Example types of response packets that may be transmitted by a scanning device in response to received advertising packets of the advertising device include:
  SCAN_REQ scan request for further information from advertiser
  CONNECT_REQ connect request.

If the advertiser sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange keys or other encryption info to be stored for future connections.

Instead of the CONNECT_REQ, the scanner device may also respond with SCAN_REQ, which is a request for further information from the advertiser. This may be sent as a response to ADV_IND or ADV_SCAN_IND advertising packets.

When an advertising device receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices.

The state for passing advertising packets is called "advertising state" and the state for connection is called "connected state". In both states, data transfer occurs. A slave device may be a sensor or an actuator, such as a temperature sensor, heart rate sensor, light bulb, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertising channel may contain scanner and advertiser addresses. According to an embodiment, the packets from a master device in advertising channel contains only a master address. Further information on BLE operations and communications may be found, for example, in United States Patent Application Publication No. 2014/0321321; United States Patent Application Publication No. 2015/0319600; and United States Patent Application Publication No. 20150271628, each of which has been incorporated herein by reference in its entirety for all purposes.

Figure 2:
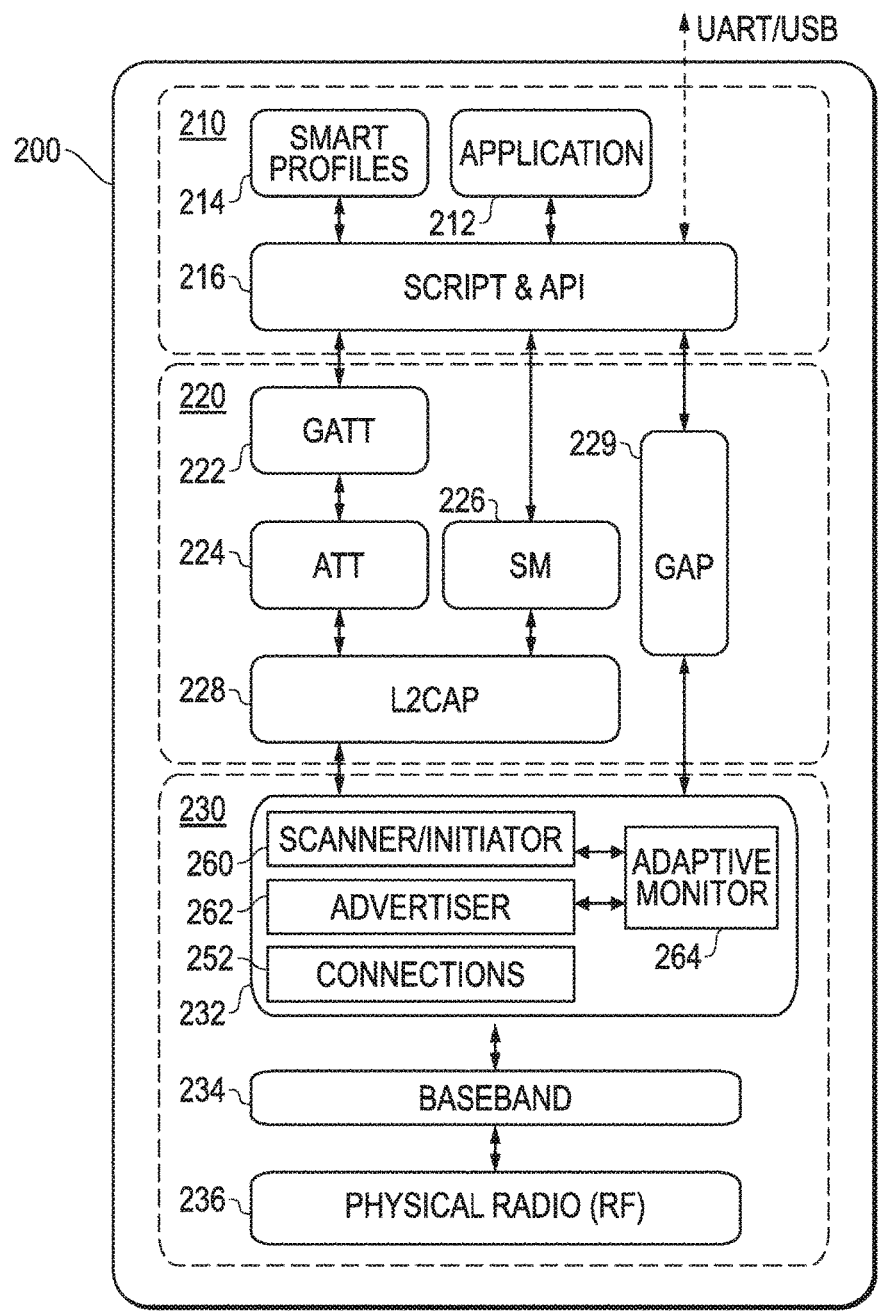
FIG. 2 illustrates a simplified block diagram of a Bluetooth smart module according to one exemplary embodiment of the disclosed systems and methods.

FIG. 2 is a simplified illustration of application, host and BLE control components of a Bluetooth smart module 200 configured according to one exemplary embodiment of the disclosed systems and methods. Although a Bluetooth smart module is illustrated, it will be understood that the disclosed systems and methods may be implemented with any other RF communication technology that employs advertising packets. Components of Bluetooth smart module 200 may be implemented, for example, using the hardware components of radio module 100 or any other suitable combination of radio hardware components. As shown, in this embodiment Bluetooth smart module 200 includes application layer 210, host layer 220 and a Bluetooth (or BLE) controller 230. Application layer 210 may include, for example, apparatus-related application/s 212 (e.g., heart rate, proximity, blood pressure, time update, temperature, battery, etc.), smart profiles 214, and script and application programming interface (API) 216. Application layer 210 is capable of reading sensor data (e.g., from heart rate sensor, etc.), and reporting the data to host layer 220 for transmission using Bluetooth (or BLE) controller 230. Host layer 220 includes protocols running over the connection. Host layer 220 also includes data to be used in advertisement profile (GATT) 222, generic access profile (GAP) 229, attribute protocol (ATT) 224, security manager (SM) 226 and logical link control and adaptation protocol (L2CAP) 228. As shown in FIG. 2, Bluetooth (or BLE) controller 230 also includes link layer 232, baseband 234, and physical layer 236 (i.e., physical radio, radio frequency RF).

Still referring to FIG. 2, link layer 232 is present to provide ultra-low power idle mode operation and device discovery (i.e., connection mode and advertising mode handling). Link layer 232 is also configured to control packet transmission and response. Link layer 232 may be configured to support one or more connections 252 or may in one embodiment be configured with multiple virtual link layers that are simultaneously operating, and a scheduler that is configured to control access of the virtual link layers to common radio resources of physical layer 236 through baseband 234 in a manner described in U.S. patent application Ser. No. 15/234,332 filed Aug. 11, 2016, which is incorporated herein by reference in its entirety for all purposes.

As further shown, link layer 232 includes a scanner/initiator state 260 for scanning and initiating connections, an advertiser state 262 for advertising, one or more connections 252, and an adaptive monitor 264 that listens for RF signal activity on advertising channels (e.g., BLE channels 37, 38 and 39) during scanning or advertising operations. Adaptive monitor 264 also controls advertising channel selection in real time for advertising and scanning operations (depending on the whether the current link layer state is advertising or scanning) based on the detected presence or absence of RF signal activity on the advertising channels in a manner as described herein. It will be understood that BLE advertising channels 37 (2402 MHz), 38 (2426 MHz) and 39 (2480 MHz) described herein are exemplary only, and that the disclosed systems and methods may be implemented in similar manner as described herein for a wireless network protocol having more than three advertising channels, or for a wireless network protocol having two advertising channels. Besides BLE protocol, the disclosed systems and methods may be implemented for any other wireless network protocol that employs multiple advertising channels, e.g., such as Konnex radio frequency (KNX-RF).

Figure 3A:
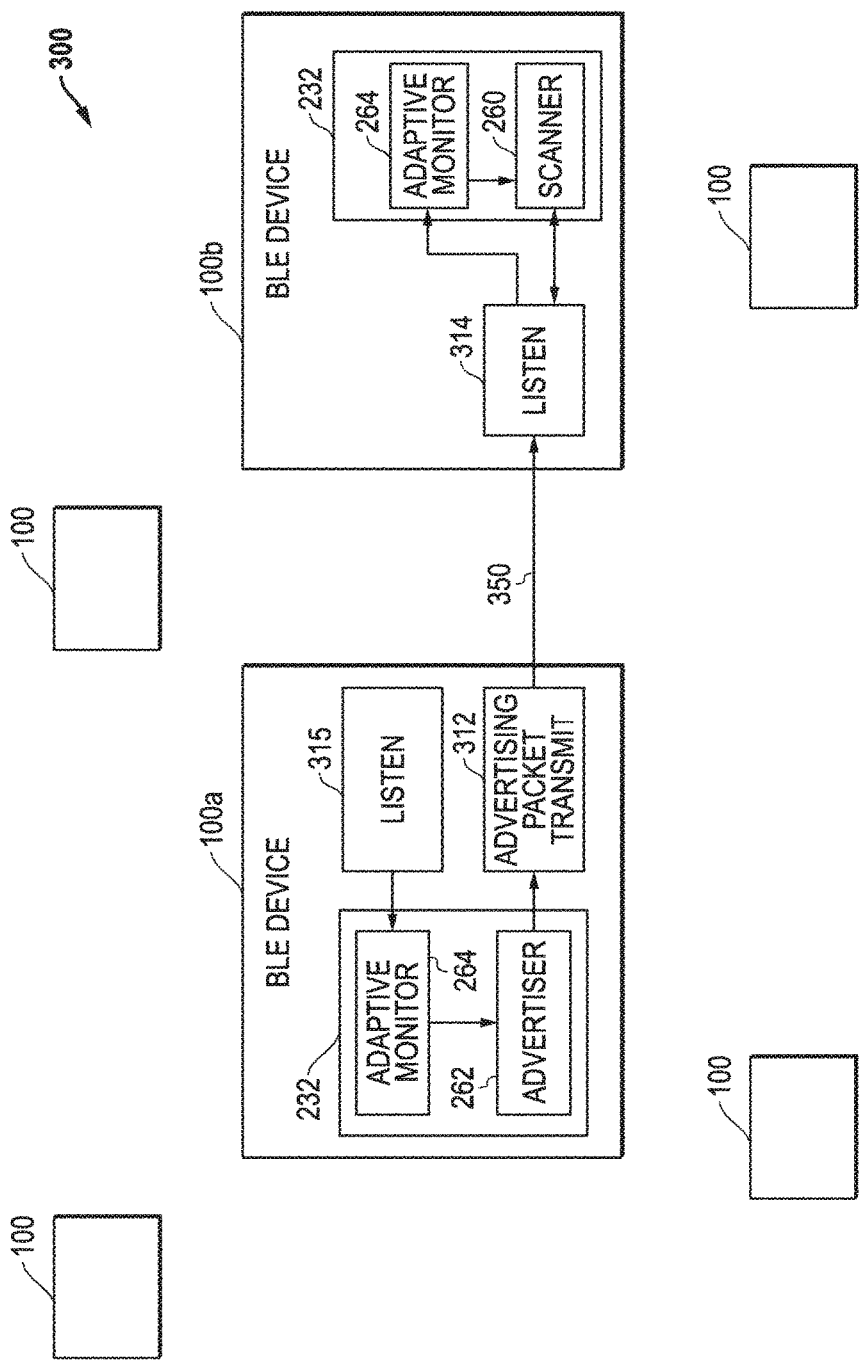
FIG. 3A illustrates a radio frequency (RF) communications environment according to one exemplary embodiment of the disclosed systems and methods.

FIG. 3A illustrates one exemplary embodiment of RF communications environment 300 that includes a transmitting device (in this case a BLE advertising device 100a) operating in advertising mode that is in wireless communication with a receiving device (in this case a BLE scanning device 100b) that is operating in scanning mode. RF communications environment may be, for example, a network mesh environment where multiple wireless devices operate simultaneously in wireless communication with each other, e.g., such as a BLE mesh network where each of multiple BLE devices 100 simultaneously perform both role of advertising device 100a and scanning device 100b. Wireless devices transmitting according to other wireless protocols (e.g., such as Wi-Fi, Zigbee, etc.) may also be operating in wireless communications environment 300.

Figure 3B:
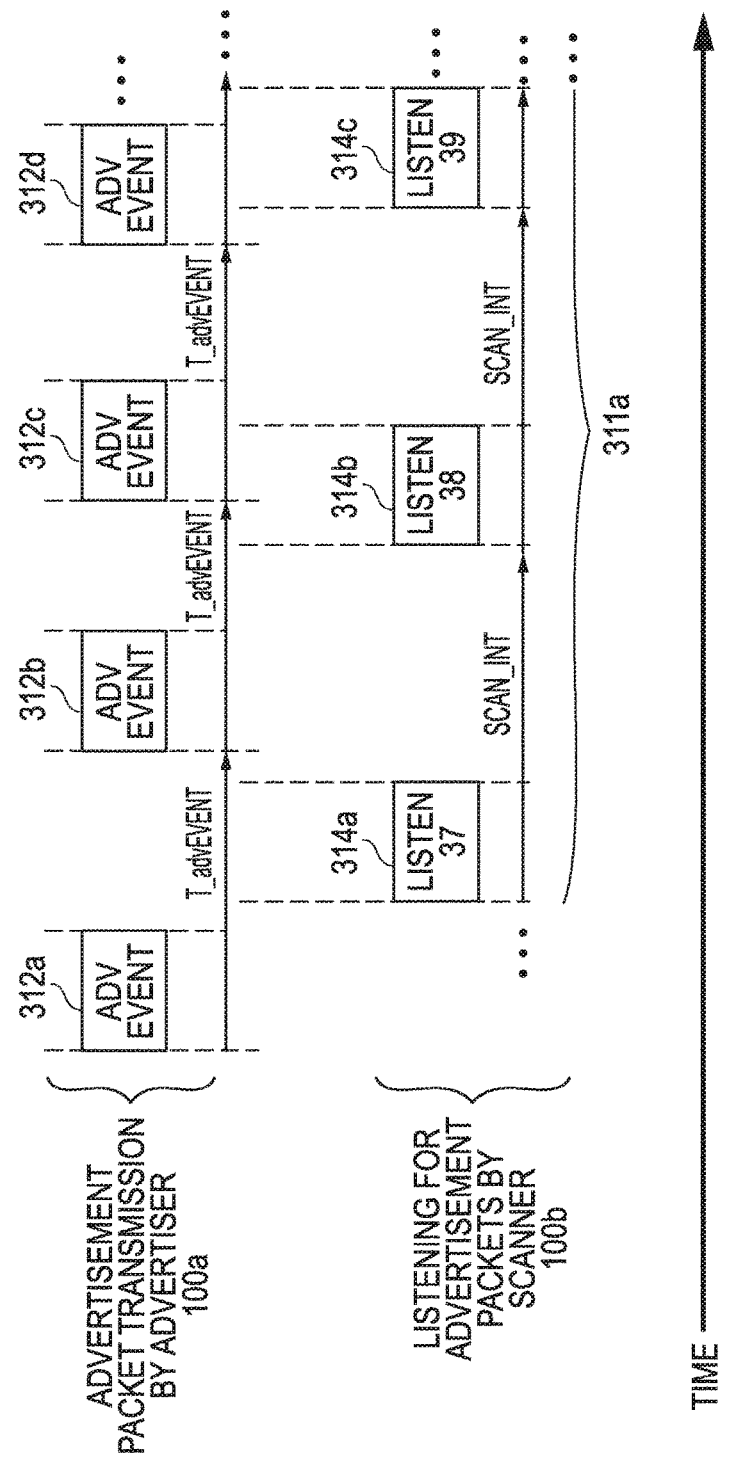
FIG. 3B illustrates a pattern of sequential advertising events and sequential scanning listening window according to one exemplary embodiment of the disclosed systems and methods.

In the embodiment illustrated in FIG. 3A, each of BLE devices 100a and 100b may include a link layer engine 125 implementing a link layer 232 for controlling transmission and reception of packets, respectively, as described and illustrated in relation to FIGS. 1 and 2. As shown in FIG. 3A, advertising device 100a is using its link layer 232 in advertising state 262 to control advertising packet transmit on one advertising channel at a time, one or more of which are being received by link layer of scanning device 100b. Link layer of advertising device 100a may use packet transmission timing parameters to control timing of sequential advertising events 312 at determined time intervals (T_advEvent) from each other as shown in FIG. 3B e.g., using a pseudorandom number generator that implements a pseudorandom number generation algorithm, such as described in U.S. patent application Ser. No. 15/197,166 filed Jun. 29, 2016, which is incorporated herein by reference in its entirety.

During each advertising event 312 of FIG. 3A, advertising packets are transmitted on different advertising channels in a manner as described further herein. After transmitting a connectable advertising packet on a given advertising channel, link layer 232 of advertising device 100a may then listen for a scan response from a scanning device 100b before transmitting a connectable advertising packet on the next advertising channel of the advertising event 312. In the case that advertising device 100a is transmitting non-connectable advertising packets, no such listening may occur after transmission of each advertising packet. As described further herein, during a given advertising event, link layer 232 of advertising device 100a may also listen before and/or after transmitting a packet on each advertising channel during a respective listening window 315, and use its adaptive monitor 264 to modify or alter the advertising channel on which an advertising packet 350 is subsequently transmitted during the same and/or subsequent advertising events 312 based on the detection of RF signal activity during the listening window 315.

Still referring to FIG. 3A, a link layer of scanning device 100b scans for and listens for advertising packets 350 on different advertising channels at sequential listening window times 314 of a scanning sequence 311 that are spaced apart from each other by a determined scan interval, scan_Int as shown in FIG. 3B. Link layer 232 of scanning device 100b may listen for advertising packets 350 during each listening window 314 and use its adaptive monitor 264 to modify or alter the advertising channel employed during one or more subsequent listening windows 314 based on the detection of extraneous RF signal activity during a listening window 314 (e.g., RF signal activity that does not have the correct access address (AA) corresponding to an advertising packet of the current wireless protocol used by the scanning device).

Figure 4A:
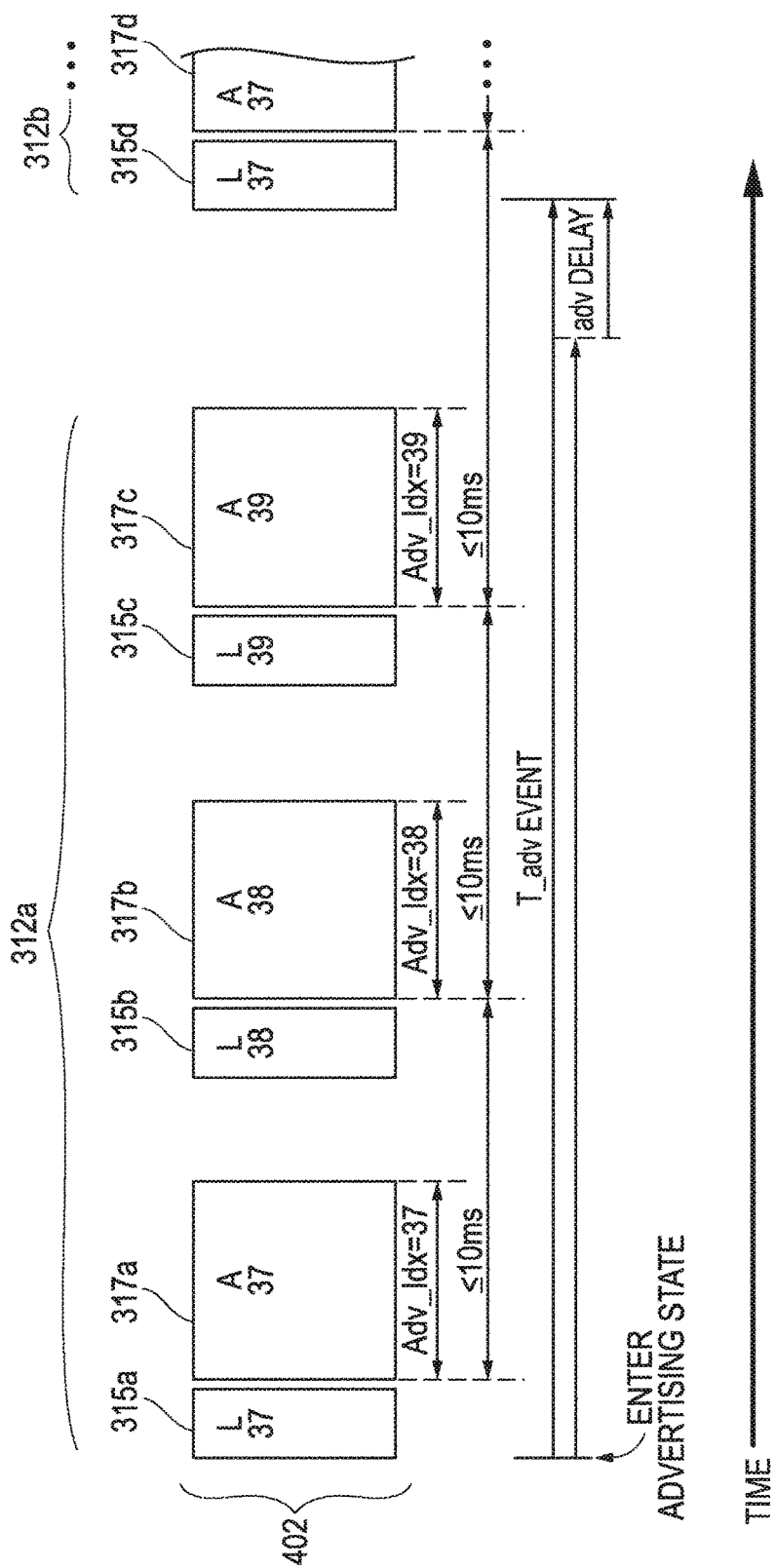
FIG. 4A illustrates a pattern of sequential advertising events according to one exemplary embodiment of the disclosed systems and methods.

FIG. 4A illustrates a pattern 402 of advertising packet transmission times 317 (317a, 317b, 317c, etc.) as they may occur during a given non-connectable and non-scannable advertising event 312, for example, according to the embodiment of FIGS. 3A and 3B. As shown, a respective advertising packet 350 is sequentially transmitted by advertising device 100a on each of advertising channels (i.e., BLE advertising channels 37, 38 and 39) during a first advertising event 312a, before starting the sequence over at the first advertising channel and repeating the advertising sequence again in a second and following advertising event 312b, and so on. It will be understood that the methodology of FIG. 4A may also be implemented with connectable and scannable advertising events 312. In such an alternate embodiment, advertising device 100a may listen for a scan response (SCAN_RSP) or scan request (SCAN_REQ) (not shown in FIG. 4A) directly after transmitting a connectable and scannable advertising packet on a given advertising channel during each transmission window 317, and before transmitting an advertising packet on the next sequential advertising channel.

As shown in FIG. 4A, each advertising event 312 begins at the end of a corresponding T_advEvent time interval 404 that consists of two components, advInterval which is a predetermined fixed time value (e.g., integer multiple of 0.625 milliseconds in the range of 20 milliseconds to 10,485.759375 seconds), and advDelay which is a pseudorandom delay time generated by link layer 232 (e.g., from 0 milliseconds to 10 milliseconds). In this embodiment, unless otherwise modified, advertising packets 350 are transmitted during advertising events 312 by advertising device 100a in a defined default priority order during each advertising sequence 310 so that advertising device 100a cycles through all advertising channels, e.g., channel 37, then channel 38, then channel 39 (i.e., 37>38>39), before starting over at channel 37 and repeating the sequence again, etc. However, any other suitable default priority order may be defined for an advertising sequence 310, e.g., such as a priority order that starts with either of channel 38 or 39, and/or that proceeds in a non-ascending order (e.g., such as 39>38>37 or 38>39>37 or 37>39>38, etc.

As shown in FIG. 4A, advertising device 100a also monitors each advertising channel of an advertising event 312 for other RF signal activity during a listening window 315 that directly proceeds the corresponding transmission window 317 on the same advertising channel. Such other RF signal activity may be, for example, RF signals of another wireless networking protocol operating on the same frequency, such as Wi-Fi or Zigbee. For BLE specification protocol advertisements, a 10 millisecond maximum time is set as the maximum time between start of adjacent transmission windows 317 on different advertising channels. As shown in FIG. 4A, for BLE advertising channel quality measurements may be scheduled to occur during this 10 millisecond maximum time between transmission windows 317. This clear channel assessment before sending each packet on an advertising channel is particularly useful in wireless network environments where intermittent interference exists on one or more of the advertising channels.

As shown in FIG. 4A, a time duration of each listening window 315 may be shorter or much shorter than time duration of each transmission window 317. In one embodiment, if other RF signal activity is detected on any given advertising channel during a current advertising event 312, the advertising device 100a may immediately skip transmission of the advertising packet 350 on that given channel for the current advertising sequence 312, e.g., attempting transmission of the given advertising packet 350 only on the other channels of the current advertising event 312 for which other RF signal activity was not detected during listening windows 315 corresponding to those other channels.

Figure 4B:
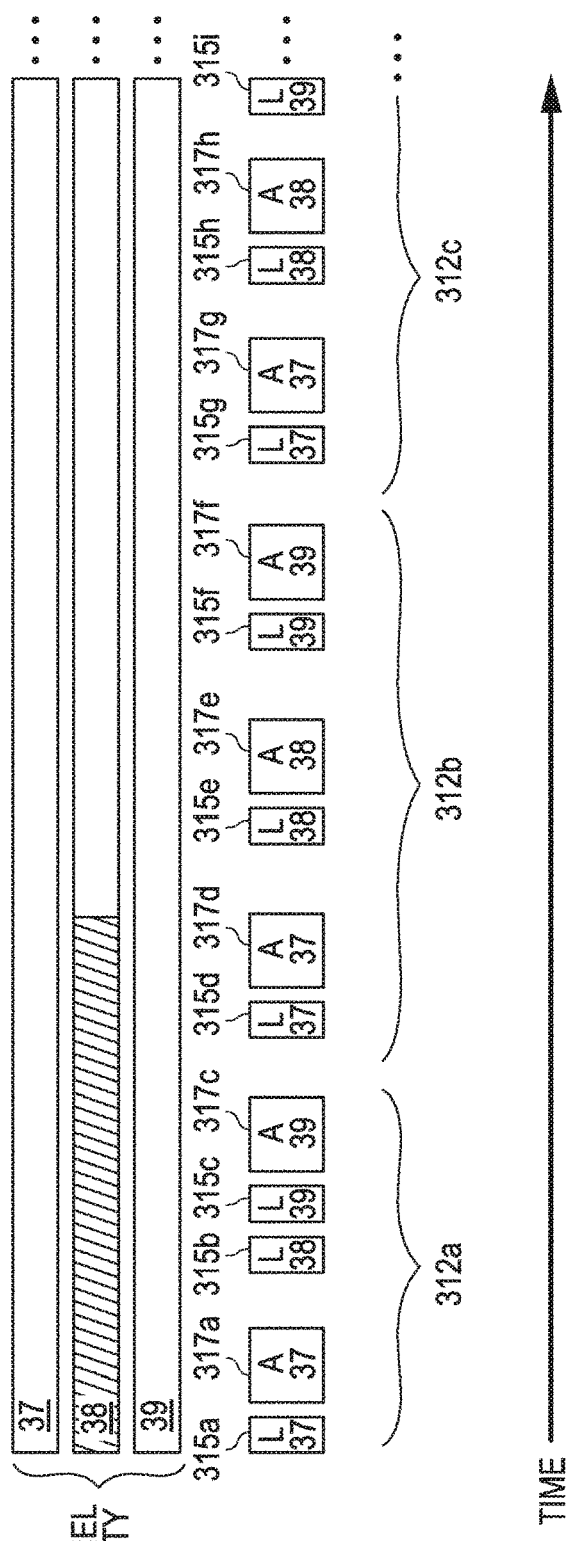
FIG. 4B illustrates a pattern of sequential advertising events according to one exemplary embodiment of the disclosed systems and methods.

For example, FIG. 4B illustrates one exemplary embodiment in which detected other RF signal activity exists on BLE advertising channel 38 throughout a first advertising event 312a and part of a second advertising event 312b (as shown by the hashed bar of channel 38 in FIG. 4B). In this embodiment, no other RF signal activity exists during this time on the other BLE advertising channels 37 and 39. Adaptive monitor 264 of advertising device 100a accordingly detects the presence of the other RF signal activity on channel 38 during listening window 315b of first advertising event 312a, and based on detection of this detected other RF signal activity then modifies the BLE advertising channel priority order for transmission of the current advertising packet 350 by skipping transmission of the advertising packet 350 on channel 38 during the advertising event 312a. However, adaptive monitor 264 proceeds as shown with the scheduled transmission of advertising packets 350 on BLE advertising channels 37 and 39 on which no other RF signal activity was detected during listening windows 315a and 315c of advertising event 312a. advertising events 317 by transmitting the advertising packet 350 on all advertising channels 37, 38 and 39 of the first advertising event 312a.

After completing the modified advertising channel sequence of advertising event 312a, the advertising device 100a may then again similarly listen before transmission of an advertising packet 350 on each of advertising channels 37, 38 and 39 during the following advertising event 312b as shown. In this case, no other RF signal activity is detected on any of the advertising channels in any of the listening windows 315 of advertising events 312b and 312c, and thus the advertising packet 350 will be transmitted on all BLE advertising channels 37, 38 and 39 according to the unmodified advertising channel priority order during advertising events 312b and 312c. This process is repeated over and over for all subsequent advertising events 312.

Figure 4C:
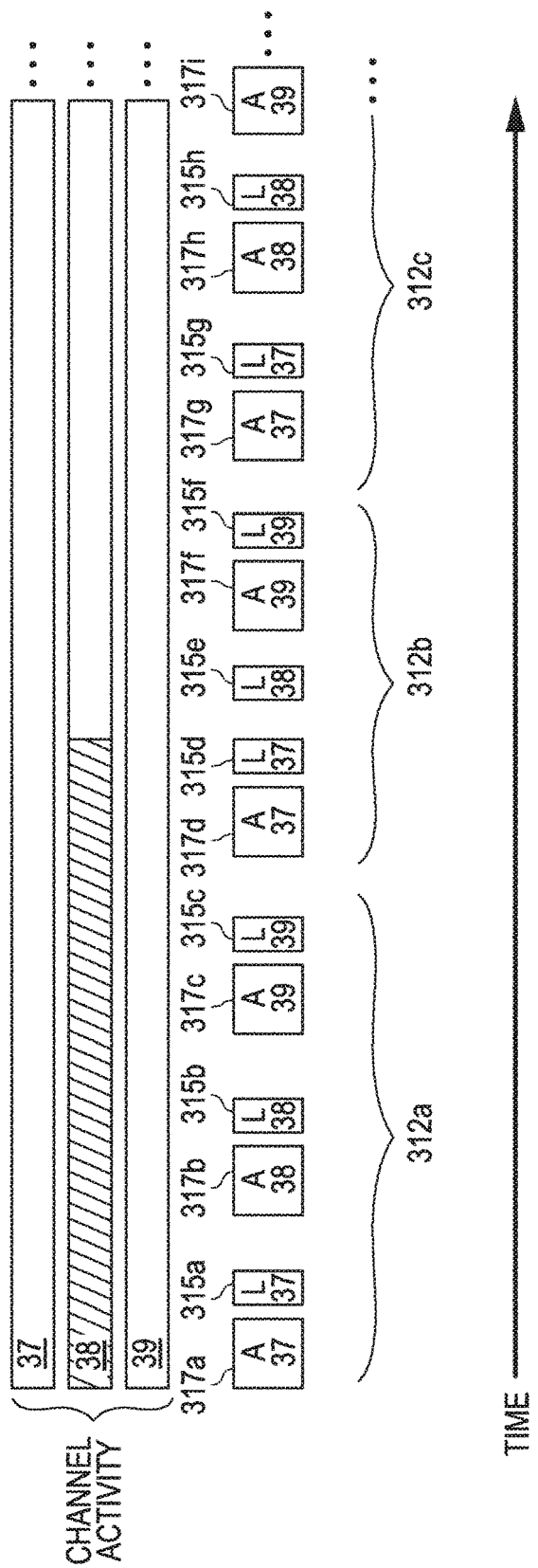
FIG. 4C illustrates a pattern of sequential advertising events according to one exemplary embodiment of the disclosed systems and methods.

In another embodiment illustrated in FIG. 4C, the advertising device 100a may monitor each advertising channel of a non-connectable and non-scannable advertising event 312 for other RF signal activity during a listening window 315 that directly follows the corresponding transmission window 317 on the same advertising channel, i.e., during a time period where no packet listening conventionally occurs following each advertising packet transmission. For example as shown in FIG. 4C, other RF signal activity exists on channel 38 during a first advertising event 312a and part of a successive advertising event 312b. However, no other RF signal activity exists during this time on the other BLE advertising channels 37 and 39. Adaptive monitor 264 of advertising device 100a accordingly detects the presence of the other RF signal activity on channel 38 during listening window 315b of first advertising event 312a, and based on detection of this detected other RF signal activity then modifies the BLE advertising channel priority order for transmission of the current advertising packet 350 by skipping transmission of the advertising packet 350 on channel 38 during the subsequent advertising event 312b. At the same time, adaptive monitor 264 proceeds as shown with the scheduled transmission of advertising packets 350 on BLE advertising channels 37 and 39 during advertising event 312b as shown. Although transmission on channel 38 is skipped during advertising event 312b, adaptive monitor 264 monitors for presence of other RF signal activity on channel 38 (without transmitting on channel 38) during listening window 315e of advertising event 312b. In this case, no other RF signal activity is detected on channel 38 during advertising event 312b, and therefore advertising packet 350 is transmitted on all advertising channels 37, 38 and 39 according to the schedule default priority channel order during subsequent advertising event 312c.

In another embodiment, an advertising device 100a may skip transmission of an advertising packet 350 on a given advertising channel only when it detects that the presence of other RF signal activity on the given channel has continuously existed for a duration of time that meets or exceeds a defined signal activity minimum time threshold. For example, assume a hypothetical example that employs listen after packet transmission such as described in relation to FIG. 4C. However, in this alternate case, an advertising device 100a may alternatively be configured to skip transmission of an advertising packet 350 on a given advertising channel during a later advertising event 312 only when it detects that the presence of other RF signal activity on the given channel has continuously existed for a duration of time that meets or exceeds a defined signal activity minimum time threshold. For example, assume that in an alternate case, other RF signal activity is detected to exist on BLE advertising channel 38 throughout multiple advertising events 312a, 312b and 312c, while other RF signal activity is detected to exist on BLE advertising channel 39 only during a first advertising event 312a but not during second advertising event 312b.

In this alternate embodiment, adaptive monitor 264 of link layer 232 may measure the duration of the other RF signal activity detected on channel 38 during all listening windows 315 of events 312a, 312b and 312c, and may measure the duration of the other RF signal activity detected on channel 39 only during listening window 315b of advertising event 312a. Adaptive monitor 264 may then compare the measured duration of each of these detected other RF signal activities on channels 38 and 39 to a defined other RF signal activity minimum time threshold to determine whether to skip transmission on one of channels 38 and/or 39. For example, assume that an other RF signal activity time threshold corresponding to two consecutive advertising events 312 has been defined, it being understood that any greater or lesser signal activity minimum time may be alternatively defined and employed. Since in this hypothetical case, the measured duration of the other RF signal activity detected on channel 39 does not meet or exceed the defined measured signal activity minimum time threshold of two consecutive advertising events 312, adaptive monitor 364 of advertising device 100a may continue transmitting advertising packets 350 on advertising channel 39 during all advertising events 312a, 312b and 312c. However, since the measured duration of the other RF signal activity detected on channel 38 is continuous and exceeds the defined signal activity minimum time threshold of two consecutive advertising events 312, adaptive monitor 364 of advertising device 100a may modify the advertising event 312c by skipping transmission of the advertising packet 350 on BLE advertising channel 38 during the advertising event 312c, i.e., only transmitting the advertising packet 350 on BLE advertising channels 37 and 39 during advertising event 312c while continuing to listen for other RF signal activity on all channels during advertising event 312c.

It will be understood that a signal activity minimum time threshold may be defined to be any length that is greater or less than two consecutive advertising events 312 as needed or desired for a given application. For example, the embodiment of FIG. 4B may be implemented using a signal activity minimum time threshold that is less than or equal to a single advertising event 312, e.g., corresponding to other RF signal activity detected on a given advertising channel during a single listening window 315 of a given advertising event 312.

In another embodiment assuming the case that other RF signal activity is simultaneously detected during a given advertising event 312 on multiple given advertising channels of either FIG. 4B or 4C, then advertising device 100a may modify the advertising channel order priority by skipping transmission of the advertising packet 350 on each of the given advertising channels during a common advertising event 312, e.g., so as to only transmit the advertising packet 350 on a single advertising channel having no detected other RF signal activity where other RF signal activity is detected on two out of three available advertising channels according to the particular embodiment of FIG. 4B or 4C. If other RF signal activity is simultaneously detected on all advertising channels in a given advertising event 312, then only listening windows 315 may occurs (and transmission windows 317 on all advertising channels 37, 38 and 39 may be skipped) during a common advertising event 312.

Figure 4D:
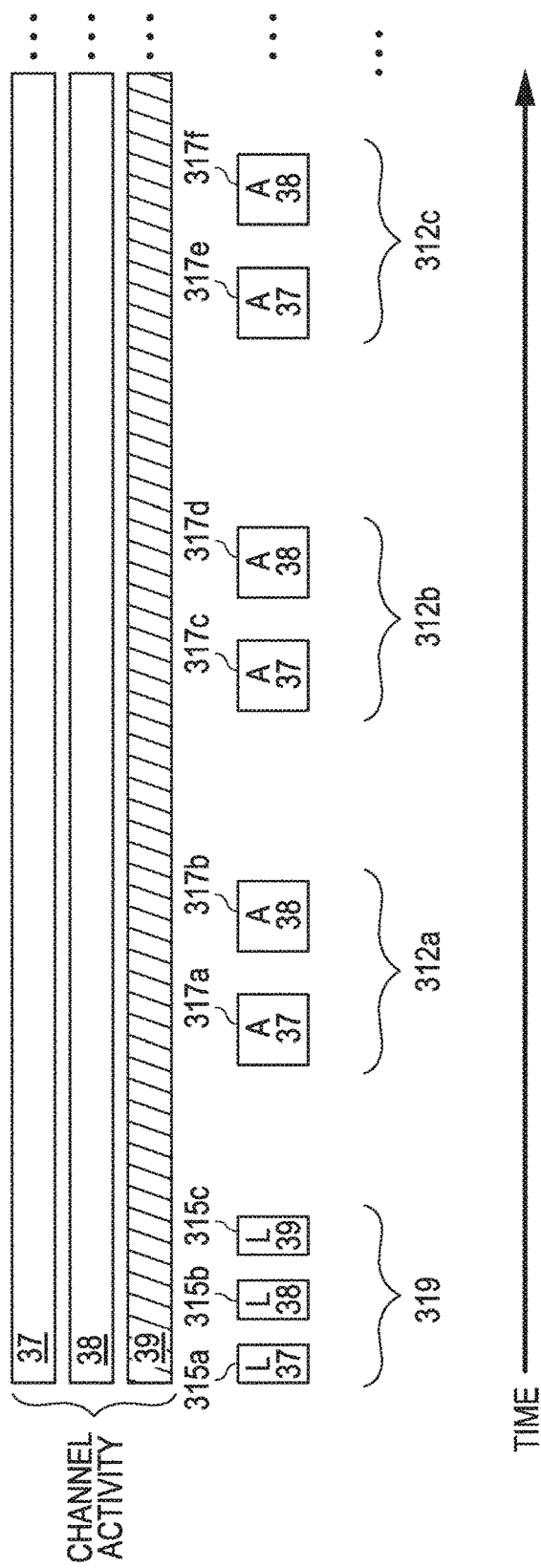
FIG. 4D illustrates a pattern of sequential advertising events according to one exemplary embodiment of the disclosed systems and methods.

FIG. 4D illustrates another exemplary embodiment in which adaptive monitor 232 of advertising device 100a may monitor each available advertising channel for other RF signal activity during a separate channel quality scan period 319 that occurs outside any advertising event 312 and prior to starting an advertising event 312a, e.g., before advertising device 100a enters advertising mode, or alternatively occurring between two advertising events while advertising device 100a is in advertising mode.

As shown in FIG. 4D, each of advertising channels 37, 38 and 39 are monitored for other RF signal activity during respective listening windows 315a, 315b and 315c of period 319. The results of channel quality scan period 319 may be used to generate a channel quality map, e.g., such as in a lookup table as shown in Table 1 below or in other suitable format. The generated channel quality map may be passed from adaptive monitor 264 to advertiser 262 in advertising state, in order to cause advertiser 262 to change the channel order priority as shown, e.g., so that advertising channel 39 is skipped during each advertising event 312 of FIG. 4D due to detection of other RF signal activity on channel 39 during channel quality scan period 319. It will be understood that multiple channel quality scan periods 319 may be performed (e.g., on a repeated periodical basis) in order to update the channel quality map with changing conditions of other RF signal activity.

TABLE 1

| Advertising Channel | Other RF Signal Activity Detected During Channel Quality Scan Period |
| --- | --- |
| 37 | No |
| 38 | No |
| 39 | Yes |

In another possible embodiment, advertising device 100a may periodically perform channel scan periods 319 as part of a separate and different process that occurs while advertising device 100a is operating in advertisement mode, and with one or more channel scan periods 319 occurring simultaneously with one or more advertising events 312. In such an embodiment, a channel quality map may be generated, updated and periodically provided to advertiser 262 while advertising device 100a is in advertising mode. For example, channel scan periods 319 may be implemented at the same time as (e.g., as part of) a periodical data channel analysis in which an advertising device 100a sweeps or scans through all network channels (e.g., BLE channels) to create a channel map for adaptive frequency hopping, such as is required by European Telecommunications Standards Institute (ETSI) EN 300 328 standard.

In another embodiment, a given advertising channel may only be excluded (or flagged as having interference on a channel quality map) when duration of detected other RF signal activity on that given advertising channel is found to exceed a given time threshold, e.g., such as in a manner as previously described. For example, advertising transmissions on a given advertising channel may only be skipped when other RF signal activity interference is found to exist on the given channel for greater than or equal to a given threshold minimum number (e.g., two or more, three or more, four or more, etc.) of successive scheduled listening windows 315 on that channel regardless of the particular scheme employed for scheduling the listening windows. Alternatively, channel quality analysis may be performed statistically for a given advertising channel by monitoring for the presence of other RF signal monitoring activity across multiple listening windows. For example, a scheduled transmission window 317 for a given advertising channel may be skipped only when other RF signal activity is found to exist more than a minimum threshold average fraction of elapsed time (e.g., such as 50% or more of the elapsed time) over a specified number of multiple listening windows 315 (e.g., such as 10 listening windows) for that given channel.

In yet another embodiment, a channel quality map may be pre-configured with the identity of advertising channels which are known to have frequencies that are overlapped by the frequency of a wireless network/s (e.g., such as Wi-Fi or LTE network) or other RF interference source that is known to operating within the same wireless range environment of advertising device 100a. This pre-configured channel quality map may be provided to advertising device 100a in advance, e.g., before beginning wireless communications. In any case, channel quality map information may be stored in volatile and/or non-volatile memory of advertising device 100a, and accessed and updated as needed.

In any case, it may be seen that advertising events 312 may be shorter where transmission on one more advertising channels is skipped (e.g., see embodiments of FIGS. 4B, 4C and 4D) due to detected other RF signal activity, as there will be no advertising activity occurring on the advertising channel/s having interference during a given advertising event 312. For example, during a BLE advertising event 312 the time between start of transmission windows 317 on different BLE advertising channels may be varied as desired or needed, e.g., with the maximum time interval between transmission windows 317 on different BLE advertising channels being less than or equal to 10 milliseconds and with the minimum time interval between transmission on different BLE advertising channels being 0 seconds. Within this allowable time duration (0 ms to 10 ms), an advertising packet may be sent as fast as possible on the next advertising channel, for example if interference is detected on advertising channel 38 then transmission on channel 38 is omitted or skipped, and transmission immediately continues on channel 39. At the same time, the time interval between the beginning of adjacent BLE advertising events 312 remains equal to T_advEvent, e.g., as shown in FIG. 4A.

Figure 5A:
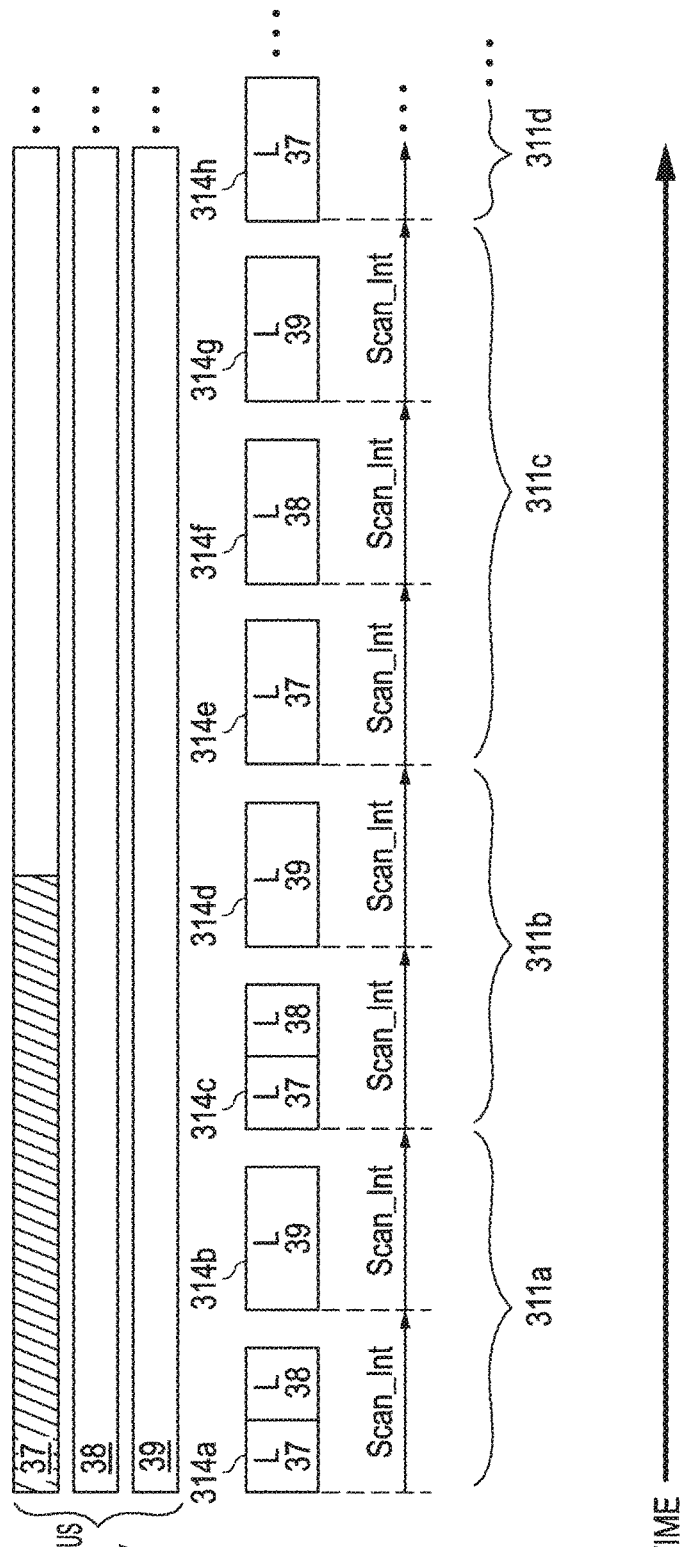
FIG. 5A illustrates a pattern of sequential scanning listening windows according to one exemplary embodiment of the disclosed systems and methods.

As shown in the exemplary embodiment of FIG. 5A, scanning device 100b may immediately switch to a different advertising channel when extraneous signal activity (e.g., non-BLE protocol signal activity in this case) is detected during the initial portion of any current listening window 314. In FIG. 5A, scanning device 100b is programmed to scan according to a defined scanning sequence, in this case to scan in the default priority order of channel 37 first, then channel 38 and then channel 39, before repeating the sequence again. However, any other suitable default priority order may be defined for a scanning sequence 311, e.g., such as a priority order that starts with either of channel 38 or 39, and/or that proceeds in a non-ascending order (e.g., such as 39>38>37, 38>39>37, 37>39>38, etc. During scanning, an extraneous RF signal may be identified by adaptive monitor 364 of advertising device 100b as detected signal activity on the advertising channel of the current listening window 314 that does not have a valid access address (AA), e.g., which is 0x8e89bed6 in the case of BLE protocol.

For example, in FIG. 5A extraneous activity is initially identified on advertising channel 37 during scanning device listening window 314a when no packet has been received having a valid BLE AA within a defined maximum listening time threshold by scanning device 100b. When this occurs, scanning device 100b immediately switches the current listening window 314a to the next priority channel of the scanning sequence 311a, which is advertising channel 38 in this example. It will be understood that a maximum listening time threshold may be of any time duration that is selected as desired or needed for the characteristics of a given application. The current scanning sequence 311a is then completed with advertising channel 39 in listening window 314*b* before the next scanning sequence 311*b* begins with listening again on channel 37 during listening window 314*c* and repeating as before since extraneous signal activity is again detected on channel 37. In one exemplary embodiment, a maximum listening time threshold that is less than the duration of the scanning window time may be derived from the time of maximum packet length, e.g., 47 bytes or 376 microseconds. In such an embodiment, switching of advertising channel may occur when it is detected that extraneous signal activity exceeds the maximum packet length time (or exceeds a multiple of the maximum packet length time such as ten times multiple or 100 times multiple of the maximum packet length) and therefore the current channel has too much interference on the channel to deduce the channel is busy. In another exemplary embodiment, scanning window time may be, for example, from about 2.5 milliseconds to about 40.96 seconds corresponding to scan window length for BLE protocol packets. In the latter embodiment, switching of advertising channels may occur after the scan window ends.

Figure 5B:
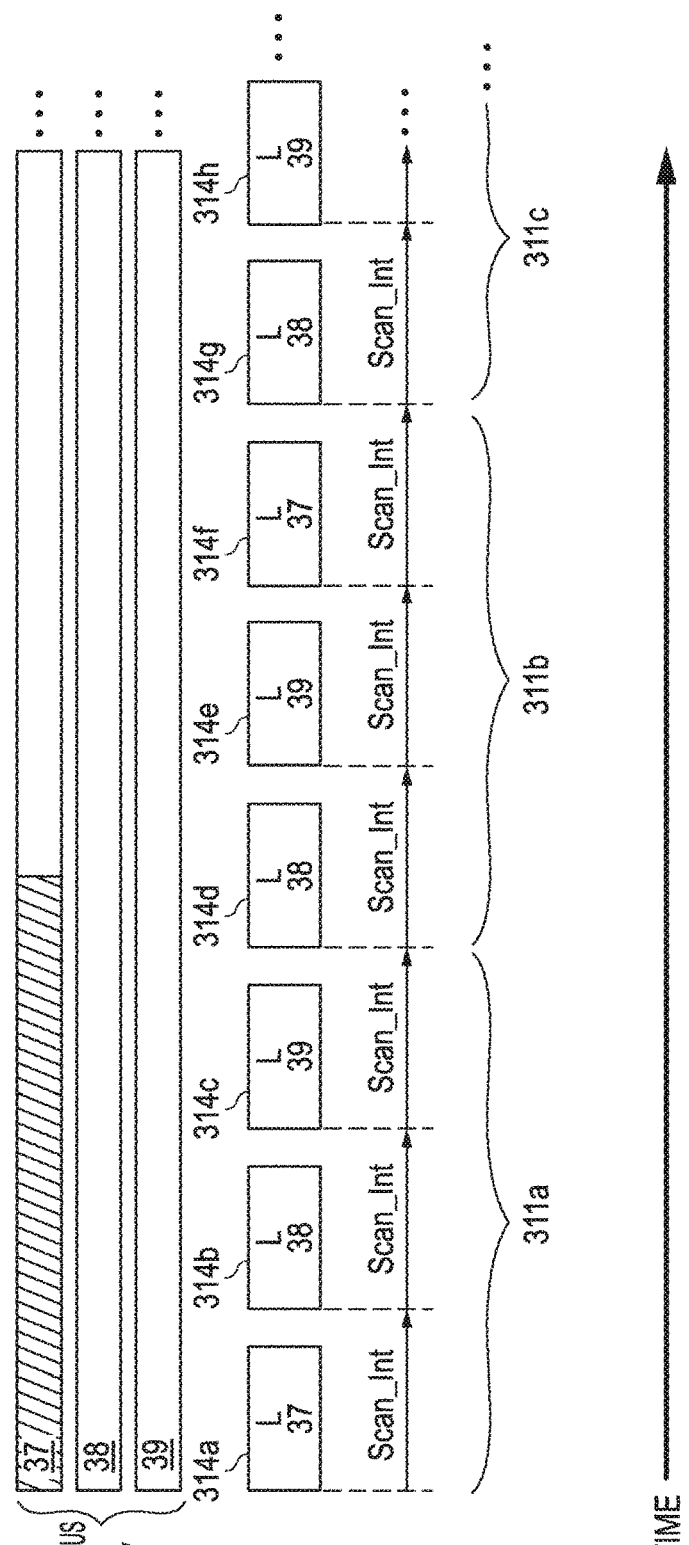
FIG. 5B illustrates a pattern of sequential scanning listening windows according to one exemplary embodiment of the disclosed systems and methods.

In an alternative embodiment illustrated in FIG. 5B, scanning device 100*b* may lower a future scanning priority of a given advertising channel when extraneous signal activity is detected on that given channel during the initial portion of any listening window 314. For example, scanning device 100*b* may be initially programmed to scan according to a default scanning order priority, in this case to scan in the priority order of channel 37 first, then channel 38 and then channel 39, before repeating the sequence again. In the example of FIG. 5B, an extraneous RF signal (e.g., non-BLE protocol signal) exists on advertising channel 37 during scanning sequence 311*a*, and will thus detected by adaptive monitor 364 of advertising device 100*b* during listening window 314*a*. Rather than immediately switching to another advertising channel during listening window 314*a*, scanning device may proceed in this embodiment with listening according to the default channel order priority during current scanning sequence 311*a*. However, scanning device 100*b* may modify the scanning order priority by lowering the channel priority of advertising channel 37 for future scanning sequences 311. This is shown in FIG. 5B, where the scanning priority order for scanning sequence 311*b* and 311*c* have each been altered to be channel 38 first, then channel 39 and then channel 37 (i.e., 38>39>37). In this embodiment, the same modified priority order may be repeated for all future scanning sequences, until extraneous RF signal activity is detected on another of advertising channels 38 or 39. In an alternate embodiment, scanning device 100*b* may modify the scanning order priority by skipping advertising channel 37 during one or more future scanning sequences 311.

In the case that extraneous RF signal activity is simultaneously detected on multiple advertising channels during a given scanning sequence 311, then scanning device 100*b* may modify the scanning order priority by lowering the channel priority of the multiple advertising channels having detected extraneous RF signal activity relative to other advertising channel/s having no detected extraneous RF signal activity for future scanning sequences 311. If extraneous RF signal activity is simultaneously detected on all advertising channels during a given scanning sequence 311, then the scanning order priority may be left unchanged for later scanning sequences 311.

Figure 6A:
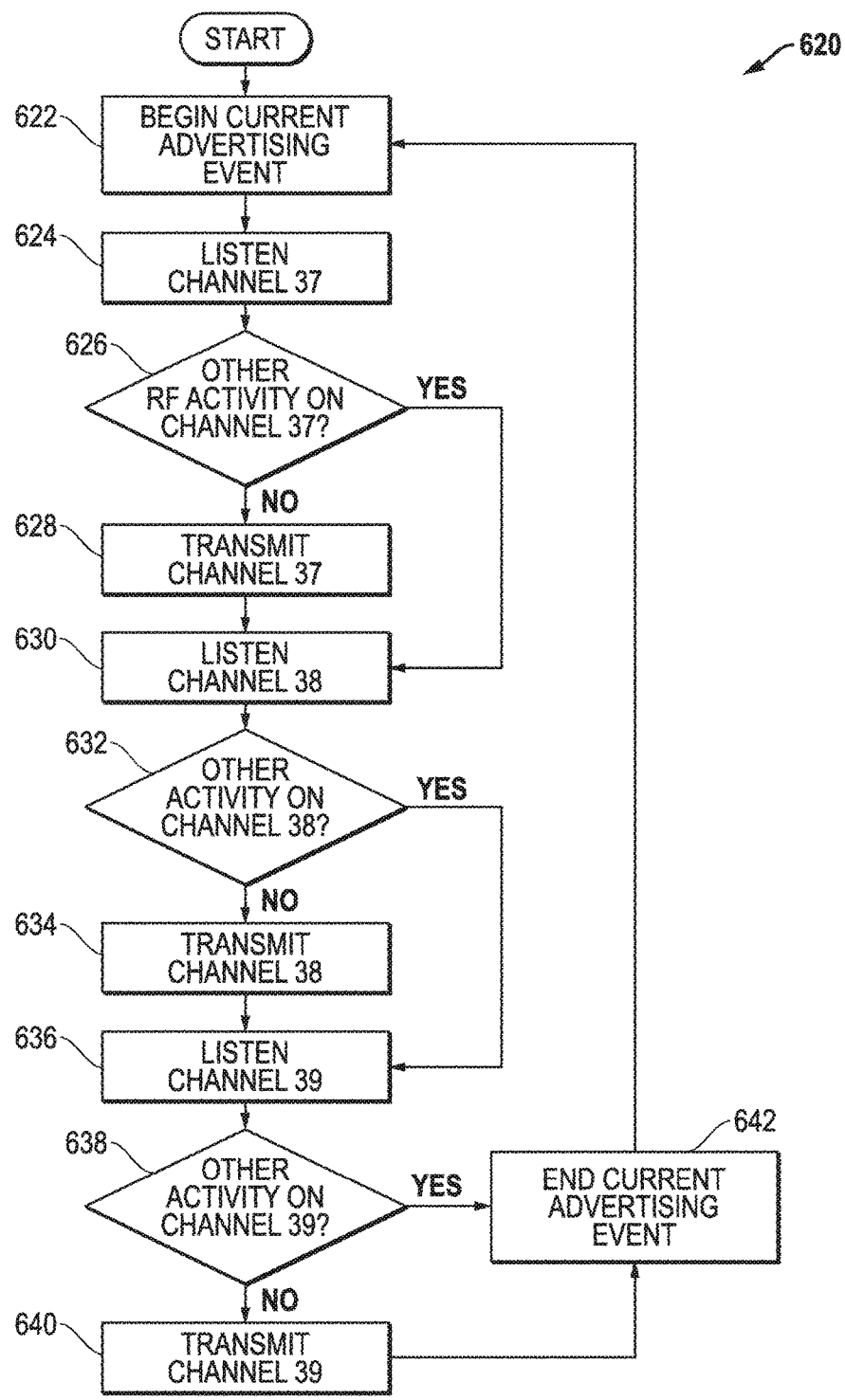
FIG. 6A illustrates methodology according to one exemplary embodiment of the disclosed systems and methods.

FIG. 6A illustrates one exemplary embodiment of methodology 620 as it may be implemented by a link layer of an advertising device 100*a* in advertising mode to control transmission of advertising packets 350 during advertising events 312, for example, to implement the embodiment of FIG. 4B. Although illustrated for the exemplary case of BLE protocol, it will be understood that methodology 620 may be alternatively employed for other types of wireless communication protocols. As shown, a current advertising event 312 begins in step 622 and advertising device 100*a* listens in each of steps 624, 630 and 636 on respective BLE advertising channels 37, 38 and 39, and determines the presence of other RF signal activity on each of these advertising channels in respective steps 626, 632 and 638. As shown, if no other RF signal activity is determined to be present on any of advertising channels 37, 38 and 39, then a respective advertising packet 350 is transmitted in corresponding steps 628, 634 and 640 before the current advertising event 312 is ended in step 642. However if other RF signal activity is determined to be present on any of advertising channels 37, 38 and 39, then transmission of an advertising packet 350 is skipped for the current advertising event 312 as shown. After the current advertising event 312 is closed in step 642, then a new current advertising event 312 is begun in step 622 and methodology 620 repeats for as long as advertising device 100*a* is in advertising mode.

Figure 6B:
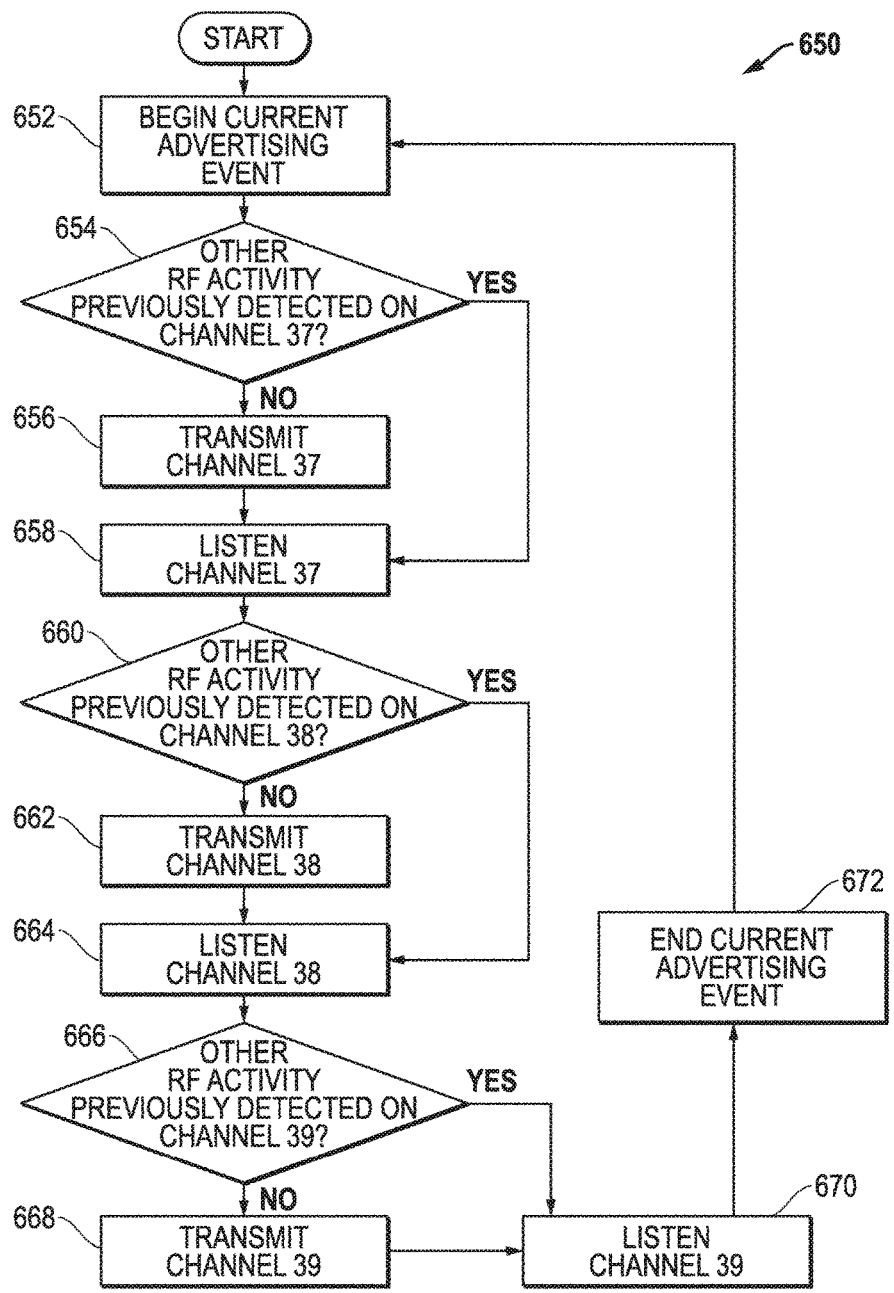
FIG. 6B illustrates methodology according to one exemplary embodiment of the disclosed systems and methods.

FIG. 6B illustrates one exemplary embodiment of methodology 620 as it may be implemented by a link layer of an advertising device 100*a* in advertising mode to control transmission of advertising packets 350 during advertising events 312, for example, to implement the embodiment of FIG. 4C. Although illustrated for the exemplary case of BLE protocol, it will be understood that methodology 620 may be alternatively employed for other types of wireless communication protocols. As shown, a current advertising event 312 begins in step 652 and advertising device 100*a* determines in each of steps 654, 660 and 666 whether the presence of other RF signal activity has been previously detected (e.g., detected during a previous advertising event 312 that immediately preceded the current advertising event 312) on each of advertising channels 37, 38 and 39, before transmitting an advertising packet 350 on each of these corresponding advertising channels in respective transmitting steps 656, 662 and 668 if no other RF signal activity has been previously detected on any of these channels. However, if other RF signal activity has been previously detected on any of advertising channels 37, 38 and 39 during the immediately preceding advertising event 312, then transmission of an advertising packet 350 is skipped for the current advertising event 312 as shown. In either case, advertising device 100*a* listens in each of steps 658, 664 and 670 on respective BLE advertising channels 37, 38 and 39 after transmitting (or skipping transmittal) of each advertising packet 350 as shown, and based on this listening determines the presence of other RF signal activity on each of the respective advertising channels for use in determining whether or not to transmit advertising packet 350 on each channel during the immediately following advertising event 312. After the current advertising event 312 is closed in step 672, then a new current advertising event 312 is begun in step 652 and methodology 650 repeats for as long as advertising device 100*a* is in advertising mode.

Figure 6C:
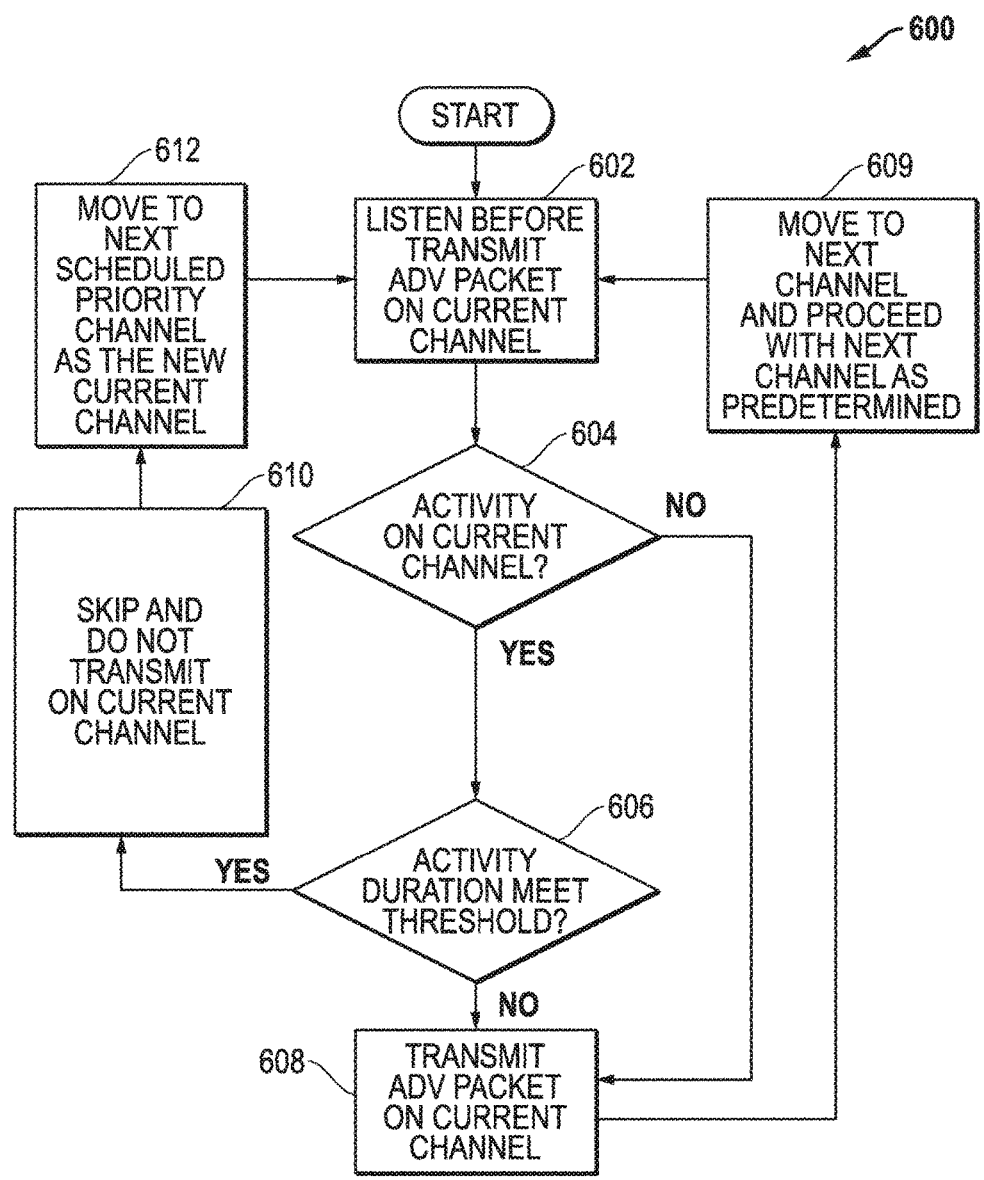
FIG. 6C illustrates methodology according to one exemplary embodiment of the disclosed systems and methods.

FIG. 6C illustrates one exemplary embodiment of methodology 600 as it may be implemented by a link layer of an advertising device 100*a* to control transmission of advertising packets 350 based on detected duration of detected other RF signal activity on one or more advertising channels. As shown, methodology 600 starts in step 602 by listening before transmitting on a current advertising channel before transmitting an advertising packet 350 during a current advertising event 312 of a current advertising sequence 310 that is implemented according to a current advertising channel priority order for the current advertising sequence 310. In step 604, it is then determined if other RF signal activity exists on the current advertising channel. If not, then methodology 600 proceeds to step 608 and transmits an advertising packet 350 on the current advertising channel during the current advertising event. Methodology 600 then moves to the next advertising channel in step 609 according to the advertising channel priority order of the current advertising sequence 310 (if any channel remains in the current sequence 310) or to the first scheduled advertising channel of the next advertising sequence 310 (if not), without modifying the advertising channel priority order of any future advertising sequence 310, and returns to step 602.

However, if other RF signal activity is determined to exist on the current advertising channel in step 604, then methodology 600 of FIG. 6C proceeds to optional step 606 where it is determined if the continuous duration of the other RF signal activity has met or exceeded a defined signal activity minimum time threshold. For example, to implement the embodiment of FIG. 4C, a signal activity minimum time threshold may be defined that corresponds to the duration of listening windows 315 of two consecutive advertising sequences 310. Alternatively, to implement the embodiment of FIG. 4B, step 606 may be skipped and proceed directly to step 610, or a signal activity minimum time threshold may be defined that corresponds to a listening window 315 of a single advertising sequence 310. If it is determined in step 606 that the defined signal activity minimum time threshold has not been met, then methodology 600 proceeds to step 608 which is performed as previously described. However, if it is determined in step 606 that the defined signal activity minimum time threshold has been met or exceeded, then methodology 600 proceeds to step 610 and transmits an advertising packet 350 on the current advertising channel during the current advertising event, but sets the identity (frequency) of the current advertising channel to be skipped during the next following advertising sequence 310. Then methodology 600 moves to a next scheduled advertising channel in step 612 which may be another advertising channel of the current advertisement sequence of the current advertising sequence (if any remains), or may be a first advertising channel of the next advertising sequence 310 if no channel remains in the current advertising sequence 310.

Figure 7:
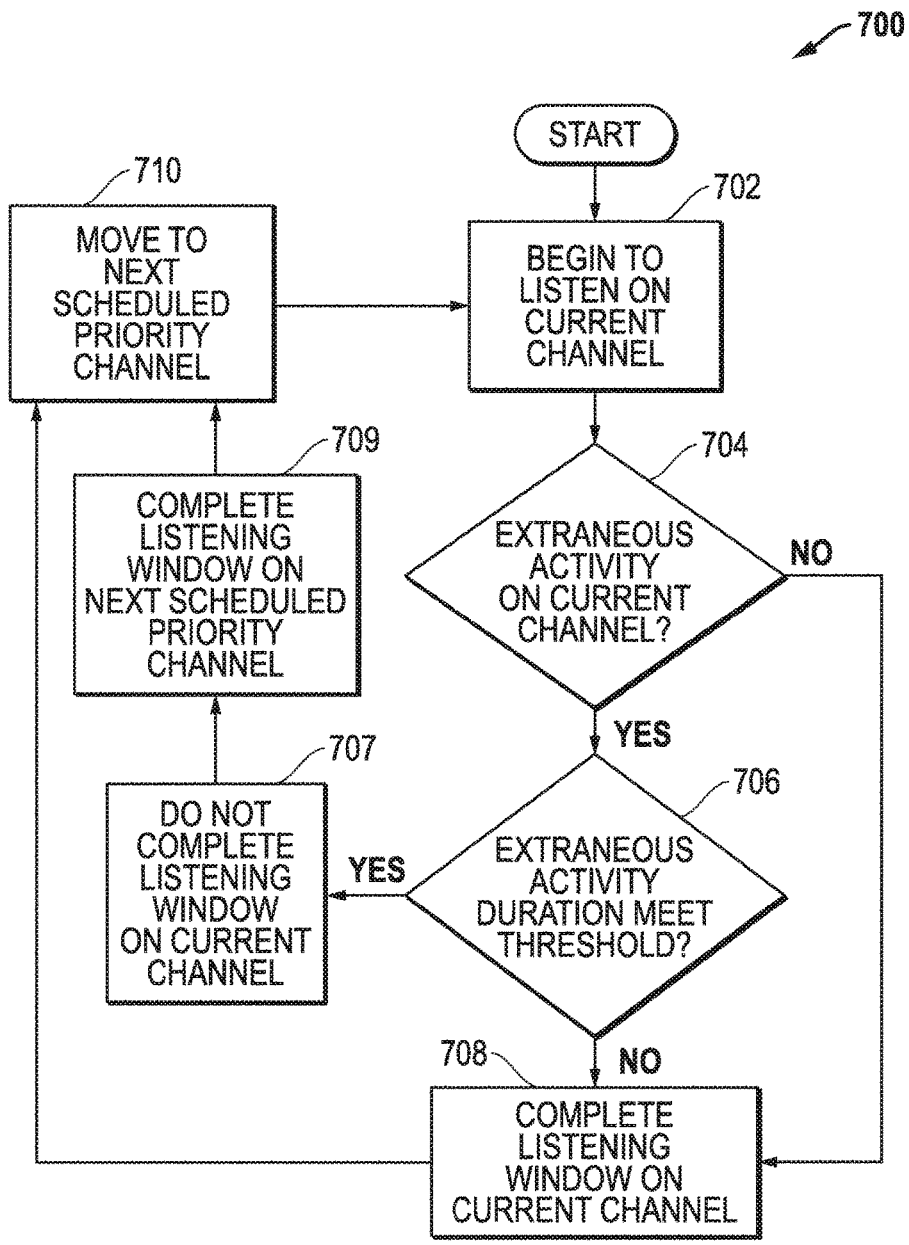
FIG. 7 illustrates methodology according to one exemplary embodiment of the disclosed systems and methods.

FIG. 7 illustrates one exemplary embodiment of methodology 700 as it may be implemented by a link layer of a scanning device 100b to control listening for advertising packets 350, for example, to implement the embodiment of FIG. 5A. As shown, methodology 700 starts in step 702 with scanning device 100b listening to a current advertising channel during a current listening window 314 of a current scanning sequence 311 according to a current scanning channel priority order for the current scanning sequence 311. In step 704 it is determined if extraneous RF signal activity exists on the current scanning channel and, if not, then methodology 700 proceeds to step 708 where it completes the listening window 314 on the current scanning channel before moving in step 710 to the next scheduled priority advertising channel of the current scanning sequence 311 (if any remains), or to the first advertising channel of the next scanning sequence 311 if the current scanning sequence 311 is complete. Methodology 700 then repeats starting in step 702.

If extraneous RF signal activity is determined to exist on the current scanning channel in step 704 then methodology 700 proceeds to step 706 where it is determined whether the extraneous RF signal activity has existed for a duration of time that meets a maximum listening time threshold (e.g., without receiving a valid BLE AA). If not, then methodology 700 proceeds to step 708 and continues as before. However, if it is determined in step 706 that the extraneous RF signal activity has existed for a duration of time that meets the maximum listening time threshold, then methodology 700 proceeds to step 707 where the current listening window 314 is not completed for the current advertising channel, but instead is switched and completed in step 709 on the next scheduled priority advertising channel of the current scanning sequence 311 (if any remains), or to the first advertising channel of the next scanning sequence 311 if the current scanning sequence 311 is complete. Methodology 700 then moves to step 710 and continues as before.

Figure 8:
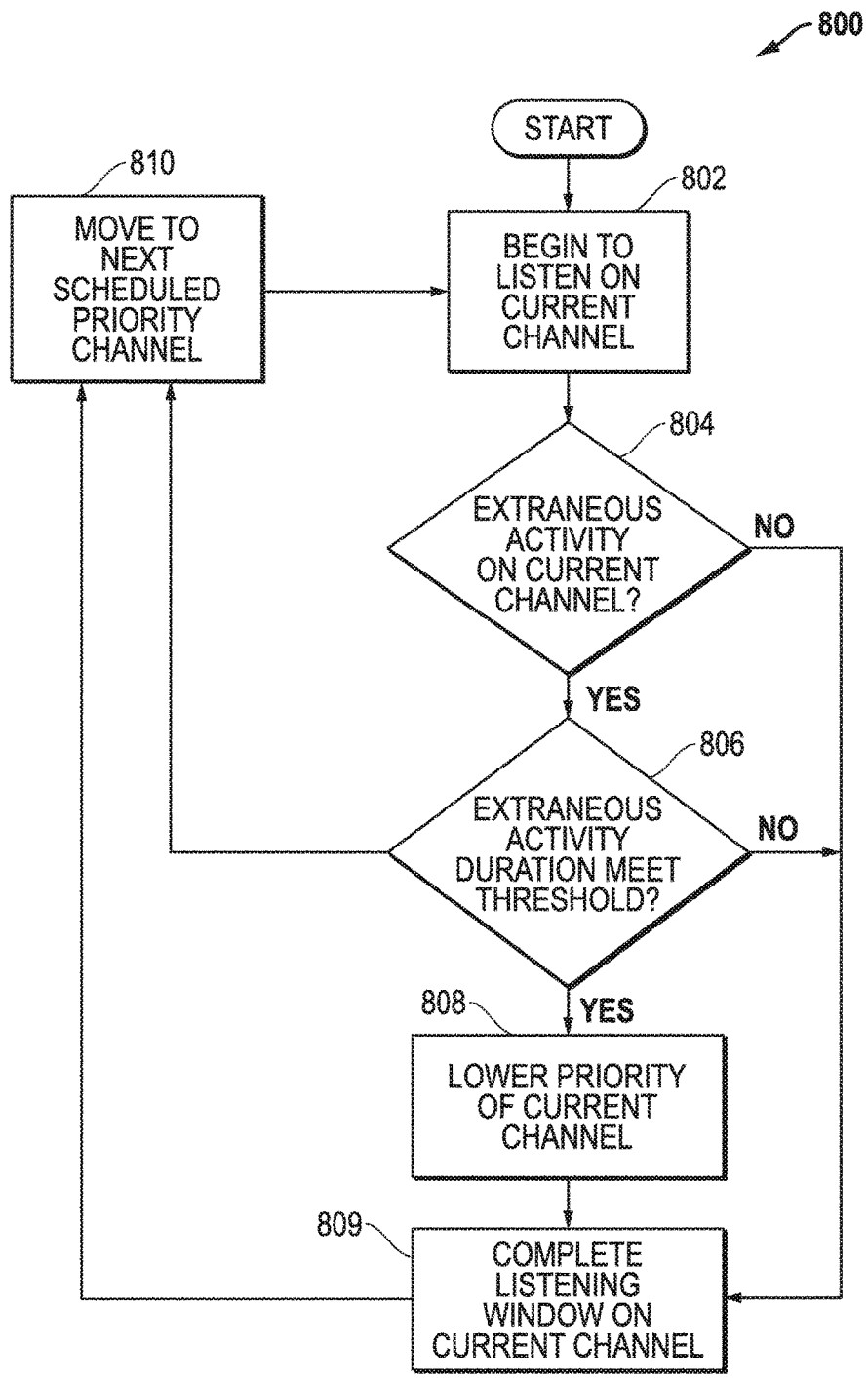
FIG. 8 illustrates methodology according to one exemplary embodiment of the disclosed systems and methods.

FIG. 8 illustrates one exemplary embodiment of methodology 800 as it may be implemented by a link layer of a scanning device 100b to control listening for advertising packets 350, for example, to implement the embodiment of FIG. 5B. As shown, methodology 800 starts in step 802 with scanning device 100b listening to a current advertising channel during a current listening window 314 of a current scanning sequence 311 according to a current scanning channel priority order for the current scanning sequence 311. In step 804 it is determined if extraneous RF signal activity exists on the current scanning channel and, if not, then methodology 800 proceeds to step 809 where the listening window 314 is completed on the current scanning channel before moving in step 810 to the next scheduled priority advertising channel of the current scanning sequence 311 (if any remains), or to the first advertising channel of the next scanning sequence 311 if the current scanning sequence 311 is complete. Methodology 800 then repeats starting in step 802.

If extraneous RF signal activity is determined to exist on the current scanning channel in step 804 then methodology 800 proceeds to step 806 where it is determined whether the extraneous RF signal activity has existed for a duration of time that meets a maximum listening time threshold (e.g., without receiving a valid BLE AA). If not, then methodology 800 proceeds to step 809 and continues as before. However, if it is determined in step 806 that the extraneous RF signal activity has existed for a duration of time that meets the maximum listening time threshold, then methodology 800 proceeds to step 808 where the priority of the frequency of the current advertising channel is lowered for future scanning sequences 311 before the current listening window 314 is completed for the current advertising channel in step 809. Then methodology 800 then moves to step 810 and continues as before.

It will be understood that methodologies 600, 620, 650, 700 and 800 are exemplary only, and that any other combination of additional, fewer, and/or alternative steps may be employed that is suitable for to adaptively control advertising and/or scanning operations on multiple advertising channels in a wireless network environment to compensate for interference encountered on advertising channels in network environments such as BLE mesh environments or any other environments where multiple wireless devices and/or different protocols simultaneously operate on similar or the same frequencies.

It will also be understood that one or more of the tasks, functions, or methodologies described herein for a radio module or radio device (e.g., including those described herein for module segment 110 and module segment 120 including link layer engine 125 of FIG. 1, link layer components 260, 262 and 264 of FIG. 2, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such programmable integrated circuits may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., example, data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed circuits and methods may be utilized in various combinations and/or independently. Thus the invention is not limited to only those combinations shown herein, but rather may include other combinations.

What is claimed is:

1. A method of operating a wireless device as an advertising device, comprising:
   monitoring multiple RF advertising channels to detect the presence of radio frequency (RF) signal activity on each of the multiple different RF advertising channels; and
   determining whether or not to transmit an advertising packet from the wireless device on each of the given RF advertising channels based on presence of detected RF signal activity on the given RF advertising channel; and
   where the method further comprises:
      performing the step of monitoring the multiple RF advertising channels during multiple separate listening windows to detect the presence of radio frequency (RF) signal activity on each of the multiple different RF advertising channels during each of the separate listening windows, and
      then determining whether to transmit an advertising packet on each of the given RF advertising channels based on the detection of RF signal activity on the given RF advertising channel during the multiple separate listening windows.

2. The method of claim 1, further comprising transmitting an advertising packet on any of the multiple RF advertising channels that have no detected RF signal activity presence.

3. The method of claim 1, further comprising attempting to transmit the advertising packet on each of the multiple RF advertising channels one at a time according to a defined priority order during a current advertising event by:
   first determining whether the presence of RF signal activity was previously detected on each given one of the RF advertising channels; and then:
      transmitting the advertising packet on a given RF advertising channel during the current advertising event as scheduled according to a defined priority order if it is determined that no RF signal activity was previously detected on the given RF advertising packet, and
      skipping transmittal of the advertising packet on the given RF advertising channel during the current advertising event if it is determined that the presence of RF signal activity was previously detected on the given RF advertising packet.

4. The method of claim 1, further comprising attempting to transmit the advertising packet on each of the multiple RF advertising channels one at a time according to a defined priority order during each of multiple sequential advertising events by:
   first determining whether the presence of RF signal activity was previously detected on each given one of the RF advertising channels during a current advertising event or during a most recent previous advertising event before the current advertising event; and then:
      transmitting the advertising packet on a given RF advertising channel during the current advertising event as scheduled according to the defined priority order if it is determined that no RF signal activity was previously detected on the given RF advertising packet during the current advertising event or during the most recent advertising event preceding the current advertising event, and
      skipping transmittal of the advertising packet on the given RF advertising channel during the current advertising event if it is determined that the presence of RF signal activity was previously detected on the given RF advertising packet during the current advertising event or during the most recent advertising event preceding the current advertising event.

5. The method of claim 1, further comprising attempting to transmit the advertising packet on each of the multiple RF advertising channels one at a time according to a defined priority order during each of multiple sequential advertising events by performing the following steps during each of the sequential advertising events:
   first monitoring to detect the presence of RF signal activity on each given RF advertising channel during a current advertising event directly before attempting to transmit the advertising packet on the given RF advertising channel; and then:
      transmitting the advertising packet on a given RF advertising channel during the current advertising event as scheduled according to the defined priority order if it is determined that no RF signal activity was detected during the current advertising event directly before attempting to transmit the given RF advertising packet during the current advertising event, and skipping transmittal of the advertising packet on the given RF advertising channel during the current advertising event if it is determined that the presence of RF signal activity was detected during the current advertising event directly before attempting to transmit the given RF advertising packet during the current advertising event.

6. The method of claim 1, further comprising attempting to transmit the advertising packet on each of the multiple RF advertising channels one at a time according to a defined priority order during each of multiple sequential advertising events by performing the following steps during each of the sequential advertising events:

first determining if the presence of RF signal activity was previously detected on each given one of the RF advertising channels during a most recent advertising event preceding a current advertising event and then:

transmitting the advertising packet on a given RF advertising channel during the current advertising event as scheduled according to the defined priority order if it is determined that no RF signal activity was detected during the current advertising event directly before attempting to transmit the given RF advertising packet during the current advertising event, and skipping transmittal of the advertising packet on the given RF advertising channel during the current advertising event if it is determined that the presence of RF signal activity was detected during the current advertising event directly before attempting to transmit the given RF advertising packet during the current advertising event; and then monitoring to detect the presence of RF signal activity on the given RF advertising channel directly after transmitting or skipping transmittal of the advertising packet on the given RF advertising channel during the current advertising event.

7. The method of claim 1, where the wireless device is a Bluetooth Low Energy (BLE) enabled device; and where the multiple RF advertising channels are BLE advertising channels.

8. A method of operating a wireless device as an advertising device, comprising:

monitoring multiple RF advertising channels to detect the presence of radio frequency (RF) signal activity on each of the multiple different RF advertising channels; and determining whether or not to transmit an advertising packet from the wireless device on each of the given RF advertising channels based on presence of detected RF signal activity on the given RF advertising channel; and where the method further comprises:

performing the step of monitoring of each of the multiple RF advertising channels during at least one channel quality scan period, then generating a channel quality map to indicate the presence of other RF signal activity on one or more of the multiple RF advertising channels that is detected during the channel quality scan period, and then determining whether to transmit an advertising packet on each of the given RF advertising channels during a current advertising event based on the indicated presence of other RF signal activity on one or more of the multiple RF advertising channels from the channel quality map; and where the method further comprises performing the channel quality scan period outside any advertising event and prior to starting the current advertising event.

9. A method of operating a wireless device as a scanning device, comprising:

using a scanning sequence of multiple listening windows to listen for advertising packets on multiple different radio frequency (RF) advertising channels according to a defined channel priority order that includes a respective listening window time assigned to each of the multiple RF advertising channels;

monitoring for the presence of extraneous RF signal activity on each of the multiple different RF advertising channels during its respective listening window time, the extraneous RF signal activity comprising a RF signal that does not have a correct access address (AA) corresponding to an advertising packet of a current wireless protocol used by the scanning device;

determining whether or not to modify the defined channel priority order of a current or future scanning sequence based on the detection of the extraneous RF signal activity on at least one of the RF advertising channels during its listening window time; and then modifying the defined channel priority order of the current or future scanning sequence if so determined based on the detected presence of the extraneous RF signal activity comprising a RF signal that does not have a correct access address (AA) corresponding to an advertising packet of a current wireless protocol used by the scanning device.

10. The method of claim 9, further comprising:

listening for advertising packets on a first RF advertising channel during a first listening window assigned to the first RF advertising channel;

monitoring for the presence of the extraneous RF signal activity on the first RF advertising channel during the first listening window; and modifying the channel priority order by switching to listen for advertising packets on a second and different RF advertising channel during the first listening window if the extraneous RF signal activity is detected on the first RF advertising channel during the first listening window, and otherwise continuing to listen for advertising packets on the first RF advertising channel during the first listening window according to the defined channel priority order.

11. The method of claim 9, further comprising:

listening for advertising packets on a first RF advertising channel during a first listening window of a first scanning sequence, the first listening window being assigned to the first RF advertising channel;

monitoring for the presence of the extraneous RF signal activity on the first RF advertising channel during the first listening window of the first scanning sequence;

completing the first listening window of the first scanning sequence by continuing to listen for advertising packets on the first RF advertising channel during the first listening window of the first scanning sequence; and modifying the channel priority order for a second scanning sequence that follows the first scanning sequence by omitting a listening window for the first RF advertising channel from the second scanning sequence if the extraneous RF signal activity is detected on the first RF advertising channel during the first listening window of the first scanning sequence, and otherwise listening for advertising packets on the first RF advertising channel during a first listening window of the second scanning sequence according to the defined channel priority order.

12. The method of claim 9, where the wireless device is a Bluetooth Low Energy (BLE) enabled device; and where the multiple RF advertising channels are BLE advertising channels.

13. A method of operating a wireless device as a scanning device, comprising:
- using a scanning sequence of multiple listening windows to listen for advertising packets on multiple different radio frequency (RF) advertising channels according to a defined channel priority order that includes a respective listening window time assigned to each of the multiple RF advertising channels;
- monitoring for the presence of extraneous RF signal activity on each of the multiple different RF advertising channels during its respective listening window time;
- determining whether or not to modify the defined channel priority order of a current or future scanning sequence based on the detection of extraneous RF signal activity on at least one of the RF advertising channels during its listening window time; and
- modifying the defined channel priority order of the current or future scanning sequence if so determined;
- where the method further comprises determining to modify the defined channel priority order of the current or future scanning sequence only upon detection of extraneous RF signal activity on at least one of the RF advertising channels for a period of time that meets a maximum listening time threshold.

14. An apparatus, comprising at least one processing device coupled to radio circuitry and configured to be coupled to an antenna as a wireless advertising device, the at least one processing device being programmed to control the advertising device to:
- monitor multiple RF advertising channels to detect the presence of radio frequency (RF) signal activity on each of the multiple different RF advertising channels; and
- determine whether or not to transmit an advertising packet from the wireless device on each of the given RF advertising channels based on presence of detected RF signal activity on the given RF advertising channel;
- where the at least one processing device is further programmed to:
  - perform the step of monitoring the multiple RF advertising channels during multiple separate listening windows to detect the presence of radio frequency (RF) signal activity on each of the multiple different RF advertising channels during each of the separate listening windows, and
  - then determine whether to transmit an advertising packet on each of the given RF advertising channels based on the detection of RF signal activity on the given RF advertising channel during the multiple separate listening windows.

15. The apparatus of claim 14, where the at least one processing device is further programmed to attempt to transmit the advertising packet on each of the multiple RF advertising channels one at a time according to a defined priority order during a current advertising event by:
- first determining whether the presence of RF signal activity was previously detected on each given one of the RF advertising channels; and then:
  - transmitting the advertising packet on a given RF advertising channel during the current advertising event as scheduled according to the defined priority order if it is determined that no RF signal activity was previously detected on the given RF advertising packet, and
  - skipping transmittal of the advertising packet on the given RF advertising channel during the current advertising event if it is determined that the presence of RF signal activity was previously detected on the given RF advertising packet.

16. The apparatus of claim 14, where the at least one processing device is further programmed to attempt to transmit the advertising packet on each of the multiple RF advertising channels one at a time according to the defined priority order during each of multiple sequential advertising events by performing the following steps during each of the sequential advertising events:
- first monitoring to detect the presence of RF signal activity on each given RF advertising channel during the current advertising event directly before attempting to transmit the advertising packet on the given RF advertising channel; and then:
  - transmitting the advertising packet on a given RF advertising channel during the current advertising event as scheduled according to the defined priority order if it is determined that no RF signal activity was detected during the current advertising event directly before attempting to transmit the given RF advertising packet during the current advertising event, and
  - skipping transmittal of the advertising packet on the given RF advertising channel during the current advertising event if it is determined that the presence of RF signal activity was detected during the current advertising event directly before attempting to transmit the given RF advertising packet during the current advertising event.

17. The apparatus of claim 14, where the at least one processing device is further programmed to attempt to transmit to transmit the advertising packet on each of the multiple RF advertising channels one at a time according to the defined priority order during each of multiple sequential advertising events by performing the following steps during each of the sequential advertising events:
- first determining if the presence of RF signal activity was previously detected on each given one of the RF advertising channels during a most recent advertising event preceding the current advertising event and then:
  - transmitting the advertising packet on a given RF advertising channel during the current advertising event as scheduled according to the defined priority order if it is determined that no RF signal activity was detected during the current advertising event directly before attempting to transmit the given RF advertising packet during the current advertising event, and
  - skipping transmittal of the advertising packet on the given RF advertising channel during the current advertising event if it is determined that the presence of RF signal activity was detected during the current advertising event directly before attempting to transmit the given RF advertising packet during the current advertising event; and
- then monitoring to detect the presence of RF signal activity on the given RF advertising channel directly after transmitting or skipping transmittal of the advertising packet on the given RF advertising channel during the current advertising event.

18. The apparatus of claim 14, where the wireless device is a Bluetooth Low Energy (BLE) enabled device; and where the multiple RF advertising channels are BLE advertising channels.

19. An apparatus, comprising at least one processing device coupled to radio circuitry and configured to be coupled to an antenna as a wireless advertising device, the at least one processing device being programmed to control the advertising device to:
monitor multiple RF advertising channels to detect the presence of radio frequency (RF) signal activity on each of the multiple different RF advertising channels; and
determine whether or not to transmit an advertising packet from the wireless device on each of the given RF advertising channels based on presence of detected RF signal activity on the given RF advertising channel;
where the at least one processing device is further programmed to:
monitor each of the multiple RF advertising channels during at least one channel quality scan period outside any advertising event and prior to starting a current advertising event,
then generate a channel quality map to indicate the presence of other RF signal activity on one or more of the multiple RF advertising channels that is detected during the channel quality scan period, and
then determine whether to transmit an advertising packet on each of the given RF advertising channels during a current advertising event based on the indicated presence of other RF signal activity on one or more of the multiple RF advertising channels from the channel quality map.

20. An apparatus, comprising at least one processing device coupled to radio circuitry and configured to be coupled to an antenna as a wireless scanning device, the at least one processing device being programmed to control the scanning device to:
use a scanning sequence of multiple listening windows to listen for advertising packets on multiple different radio frequency (RF) advertising channels according to a defined channel priority order that includes a respective listening window time assigned to each of the multiple RF advertising channels;
monitor for the presence of extraneous RF signal activity on each of the multiple different RF advertising channels during its respective listening window time, the extraneous RF signal activity comprising a RF signal that does not have a correct access address (AA) corresponding to an advertising packet of a current wireless protocol used by the scanning device;
determine whether or not to modify the defined channel priority order of a current or future scanning sequence based on the detection of the extraneous RF signal activity on at least one of the RF advertising channels during its listening window time; and
then modify the defined channel priority order of the current or future scanning sequence if so determined based on the detected presence of the extraneous RF signal activity comprising a RF signal that does not have a correct access address (AA) corresponding to an advertising packet of a current wireless protocol used by the scanning device.

21. The apparatus of claim 20, where the at least one processing device is further programmed to:
listen for advertising packets on a first RF advertising channel during a first listening window assigned to the first RF advertising channel;
monitor for the presence of the extraneous RF signal activity on the first RF advertising channel during the first listening window; and
modify the channel priority order by switching to listen for advertising packets on a second and different RF advertising channel during the first listening window if the extraneous RF signal activity is detected on the first RF advertising channel during the first listening window, and otherwise continuing to listen for advertising packets on the first RF advertising channel during the first listening window according to the defined channel priority order.

22. The apparatus of claim 20, where the at least one processing device is further programmed to:
listen for advertising packets on a first RF advertising channel during a first listening window of a first scanning sequence, the first listening window being assigned to the first RF advertising channel;
monitor for the presence of the extraneous RF signal activity on the first RF advertising channel during the first listening window of the first scanning sequence;
complete the first listening window of the first scanning sequence by continuing to listen for advertising packets on the first RF advertising channel during the first listening window of the first scanning sequence; and
modify the channel priority order for a second scanning sequence that follows the first scanning sequence by omitting a listening window for the first RF advertising channel from the second scanning sequence if the extraneous RF signal activity is detected on the first RF advertising channel during the first listening window of the first scanning sequence, and otherwise listening for advertising packets on the first RF advertising channel during a first listening window of the second scanning sequence according to the defined channel priority order.

23. The apparatus of claim 20, where the wireless device is a Bluetooth Low Energy (BLE) enabled device; and where the multiple RF advertising channels are BLE advertising channels.

24. An apparatus, comprising at least one processing device coupled to radio circuitry and configured to be coupled to an antenna as a wireless scanning device, the at least one processing device being programmed to control the scanning device to:
use a scanning sequence of multiple listening windows to listen for advertising packets on multiple different radio frequency (RF) advertising channels according to a defined channel priority order that includes a respective listening window time assigned to each of the multiple RF advertising channels;
monitor for the presence of extraneous RF signal activity on each of the multiple different RF advertising channels during its respective listening window time;
determine whether or not to modify the defined channel priority order of a current or future scanning sequence based on the detection of extraneous RF signal activity on at least one of the RF advertising channels during its listening window time; and
modify the defined channel priority order of the current or future scanning sequence if so determined;
where the at least one processing device is further programmed to modify the defined channel priority order of the current or future scanning sequence only upon detection of extraneous RF signal activity on at least one of the RF advertising channels for a period of time that meets a maximum listening time threshold.

* * * * *